(12) United States Patent
Singh

(10) Patent No.: US 11,704,177 B2
(45) Date of Patent: *Jul. 18, 2023

(54) SESSION TRIAGE AND REMEDIATION SYSTEMS AND METHODS

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,711

(22) Filed: Jan. 24, 2022

(65) Prior Publication Data

US 2022/0147411 A1    May 12, 2022

Related U.S. Application Data

(63) Continuation of application No. 16/381,387, filed on Apr. 11, 2019, now Pat. No. 11,249,832.

(51) Int. Cl.

| G06F 11/00 | (2006.01) |
|---|---|
| G06F 11/07 | (2006.01) |
| G06V 30/14 | (2022.01) |
| G06V 30/18 | (2022.01) |
| G06V 30/19 | (2022.01) |
| G06V 10/82 | (2022.01) |
| G06N 20/00 | (2019.01) |
| G06V 30/10 | (2022.01) |

(52) U.S. Cl.
CPC ...... *G06F 11/0709* (2013.01); *G06F 11/0706* (2013.01); *G06F 11/079* (2013.01); *G06V 10/82* (2022.01); *G06V 30/1444* (2022.01); *G06V 30/18105* (2022.01); *G06V 30/19173* (2022.01); *G06N 20/00* (2019.01); *G06V 30/10* (2022.01)

(58) Field of Classification Search
None
See application file for complete search history.

(56) References Cited

U.S. PATENT DOCUMENTS

| 9,009,539 B1 | 4/2015 | Kompotis et al. |
| 9,218,000 B2 | 12/2015 | Mclaughlin et al. |
| 9,367,381 B2 | 6/2016 | Huang et al. |
| 9,465,719 B2 | 10/2016 | Husar et al. |

(Continued)

OTHER PUBLICATIONS

Google Scholar/Patents search—text refined (Year: 2022).*

(Continued)

*Primary Examiner* — Christopher S McCarthy

(57) ABSTRACT

A computer system is provided. The computer system includes a memory and at least one processor coupled to the memory. The at least one processor is configured to scan session data representative of operation of a user interface comprising a plurality of user interface elements; detect, at a point in the session data, at least one changed element within the plurality of user interface elements; classify, in response to detecting the at least one changed element, the at least one changed element as either indicating or not indicating an error; store an association between the error and the point in the session data; and provide access to the point in the session data via the association.

16 Claims, 22 Drawing Sheets

(56) References Cited

U.S. PATENT DOCUMENTS

| | | |
|---|---|---|
| 9,785,537 B2 | 10/2017 | Bhogal et al. |
| 9,871,815 B2* | 1/2018 | Ouchn |
| 11,314,609 B2* | 4/2022 | Rafey .................. G06N 20/00 |
| 2014/0298093 A1 | 10/2014 | Cook et al. |
| 2015/0339213 A1 | 11/2015 | Lee et al. |
| 2016/0041899 A1 | 2/2016 | Cragun et al. |
| 2017/0364402 A1 | 12/2017 | Chua et al. |
| 2018/0165179 A1 | 6/2018 | Negi et al. |
| 2018/0341254 A1 | 11/2018 | Ovens et al. |
| 2019/0303178 A1 | 10/2019 | Mastracci |
| 2020/0026536 A1 | 1/2020 | Li et al. |
| 2020/0327008 A1 | 10/2020 | Singh et al. |

OTHER PUBLICATIONS

Google Scholar/Patents search—text refined (Year: 2023).*

Notice of Allowance received in U.S. Appl. No. 16/381,389 dated Oct. 14, 2021, 7 pages.

Notice of Allowance received in U.S. Appl. No. 17/648,712 dated Mar. 7, 2023, 5 pages.

\* cited by examiner

SESSION TRIAGE AND REMEDIATION SYSTEMS AND METHODS

CROSS REFERENCE TO RELATED APPLICATIONS

This application is a continuation of U.S. patent application Ser. No. 16/381,387 (filed 11 Apr. 2019), the entire disclosure of which is hereby incorporated herein by reference.

BACKGROUND

Software support systems provide tools that enable end users and support personnel to collaborate to find workarounds or other resolutions to system errors encountered by the end users. For example, some software support systems provide end users with searchable support articles through which the users can find resolutions to many common problems. Other software support systems enable end users or support personnel to open tickets to document and manage each supportable incident reported by an end user. These tickets remain open until the incident associated with the ticket is resolved. Further some software support systems utilize tickets to provide both end users and support personnel with information regarding the status of the incident and to drive support workflow. Further still, some types of software support systems enable support personnel to review and/or control a computer system associated with the end user for diagnostic purposes. Collectively, these software support systems provide the end user and support personnel with an effective set of tools upon which to rely when troubleshooting system errors.

SUMMARY

In at least one example, a computer system is provided. The computer system includes a memory and at least one processor coupled to the memory. The at least one processor is configured to scan session data representative of operation of a user interface comprising a plurality of user interface elements; detect, at a point in the session data, at least one changed element within the plurality of user interface elements; classify, in response to detecting the at least one changed element, the at least one changed element as either indicating or not indicating an error; store an association between the error and the point in the session data; and provide access to the point in the session data via the association.

At least some examples of the computer system can include one or more of the following features. The at least one processor can be configured to classify the at least one changed element at least in part by executing a keyword search and/or a machine learning process. The at least one changed element can be stored in image data and the at least one processor can be further configured to execute an optical character recognition process and/or a computer vision process using the image data.

The system can further include a user interface. In the system, the at least one processor can be further configured to generate a summary including the point in the session data; and provide, via the user interface, access to the summary. The memory and the at least one processor can be comprised within a server computer including a first network interface coupled to the at least one processor. The computer system can further comprise a client computer distinct from the server computer, the client computer including the user interface and a second network interface configured to couple to the first network interface via a network. The summary can include an image of the user interface including the at least one changed element. The summary can include a plurality of images including the image.

In the system, the at least one processor can be further configured to record trace data concurrently with the session data; and store, at a point within the trace data corresponding to the point within the session data, an identifier of the error. The at least one processor can include a first processor distinct from a second processor. The first processor can be further configured to transmit to the second processor, in response to classifying the at least one changed element as indicating an error, a request to store the identifier of the error within the trace data. The second processor can be further configured to receive the request to store and in response to receiving the request, store, at the point within the trace data, the identifier of the error. The identifier of the error can include information depicted in the at least one changed element.

In the system, the at least one processor can be further configured to generate, in response to classifying the at least one changed element as indicating an error, an error signature that identifies the at least one changed element; store the error signature with a plurality of error signatures comprising other types of error signatures; calculate a plurality of metrics for each type of error signature within the plurality of error signatures, the plurality of metrics comprising a count of instances of error signatures of a particular type; provide the plurality of metrics within a triage interface; and receive, via the triage interface, input specifying a remediation for a type of error signature, thereby establishing the remediation as applicable to all errors with an error signature of the type.

In at least one example, a method of enhancing data descriptive of computer operations is provided. The method includes acts of scanning session data representative of operation of a user interface comprising a plurality of user interface elements; detecting, at a point in the session data, at least one changed element within the plurality of user interface elements; classifying, in response to detecting the at least one changed element, the at least one changed element as either indicating or not indicating an error; storing an association between the error and the point in the session data; and providing access to the point in the session data via the association.

At least some examples of the method can include one or more of the following features. The act of classifying the at least one changed element can include an act of executing a keyword search and/or a machine learning process. The at least one changed element can be stored in image data, and the method can further include an act of executing an optical character recognition process and/or a computer vision process using the image data. The method can further include acts of generating a summary including the point in the session data; and providing access to the summary. In the method, the act of generating the summary can include an act of generating a summary including an image of the user interface comprising the at least one changed element. The act of generating the summary including the image can include an act of generating a summary comprising a plurality of images including the image.

The method can further include acts of recording trace data concurrently with the session data and storing, at a point within the trace data corresponding to the point within the session data, an identifier of the error. The act of storing the identifier of the error can include an act of storing information depicted in the at least one changed element. The method can further include acts of generating, in response to classifying the at least one changed element as indicating an error, an error signature that identifies the at least one changed element; storing the error signature with a plurality of error signatures comprising other types of error signatures; calculating a plurality of metrics for each type of error signature within the plurality of error signatures, the plurality of metrics comprising a count of instances of error signatures of a particular type; providing the plurality of metrics within a triage interface; and receiving, via the triage interface, input specifying a remediation for a type of error signature, thereby establishing the remediation as applicable to all errors with an error signature of the type.

At least some examples are directed to a non-transitory computer readable medium storing executable instructions to triage and remediate sessions. In these examples, the instructions can be encoded to execute any of the acts of the method of enhancing data descriptive of computer operations described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
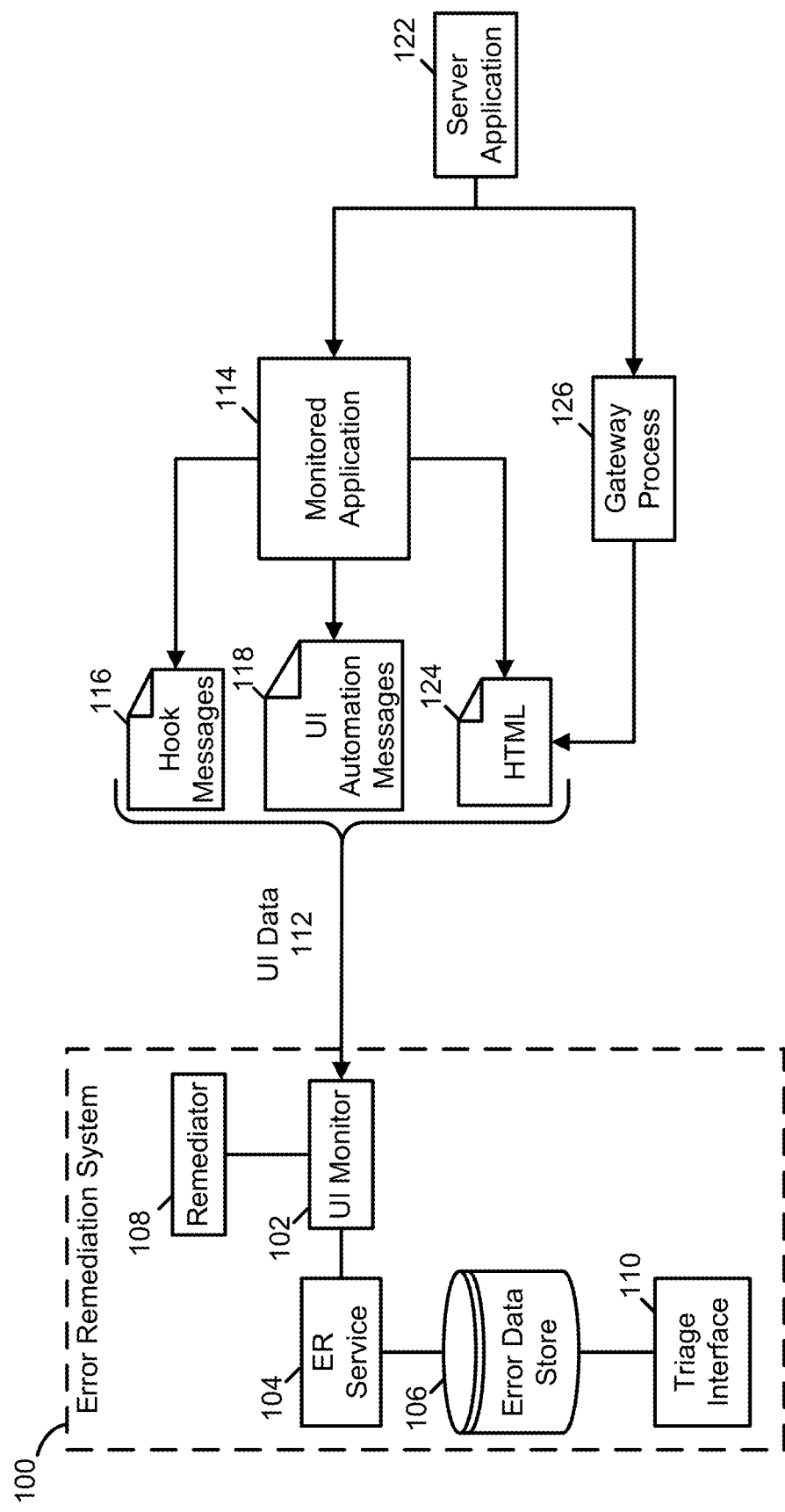
FIG. 1 is a block diagram of an error remediation (ER) system in accordance with an example of the present disclosure.

As summarized above, various examples described herein are directed to session triage and error remediation systems and methods for use with computing devices. These systems and methods overcome technical difficulties that arise when errors are encountered, for example, in a monitored application that requires a patch, upgrade, or change in configuration, but support personnel are unable to perform the required activity. In these situations, support personnel may be unable to fix to the root cause of the error but are still tasked with supporting end users who encounter the error.

To address this issue, some support personnel send emails or other sorts of messages to end users who may be affected by a given error and/or other users as a precautionary measure. But this approach is unsatisfactory in that the end users must still endure the error. Often, despite the email sent by the support personnel, the end users respond to errors by opening tickets to be serviced by the support personnel, especially where a resolution or workaround is difficult for the end user to perform. This end user behavior can be particularly troublesome where a single incident causes an error that effects a large number of users. In these situations, a large volume of tickets may be opened, thus forcing support personnel to triage multiple instances of the same issue, which results in a large amount of redundant and duplicated effort.

This redundant effort can be further exacerbated where the errors are difficult to triage. In these situations, support personnel may enable session recording and/or tracing in an attempt to capture errors within their operational contexts. However, due to the amount of contextual information they contain, session recordings and trace logs can be burdensome to navigate. Thus, the widespread use of session recording and/or tracing can produce a negative compounding effect on a support organization's ability to serve its end users.

Thus, and in accordance with at least some examples disclosed herein, session triage and error remediation systems and methods are provided. These systems and methods provide for detection of errors and other supportable events encountered by end users and present the errors and events to support personnel for triage. In some examples, a session triage system detects an error message present within live or prerecorded session data, generates an error signature unique to the error message, determines whether an error with the signature has been previously triaged, and provides a triage interface that navigates the session data to points where untriaged error messages are located. In these examples, the triage interface receives input from support personnel specifying remediations for the errors and stores the remediations in association with the signatures, so that future instances of the error can be automatically remediated. In addition, within these examples, the triage interface automatically maintains the triage status of events presented within other session recordings based on remediations specified for successfully triaged errors. In this way, the session triage systems and methods described herein automatically triage these other session recordings, relieving support personnel from the need to re-triage duplicate errors in these other session recordings.

The system and methods disclosed herein further provide for on-the-fly remediation of errors associated with error messages in a variety of monitored software applications, such as web applications, software as a service (SaaS) applications, virtual applications, and local applications (e.g., Windows® applications). In some examples, an error remediation system detects an error message, generates an error signature unique to the error message, matches the signature to a signature stored in an error record that documents a previously triaged and remediated instance of the error message, fetches a remediation stored in the record, and provides the remediation to the end user. Further, in some examples, the error remediation system provides a user interface to support personnel that enables the support personnel to identify error messages being encountered by end users, triage the error messages to select error messages with the most impact on the end users, and define remediations for the selected error messages. Remediations defined by the support personnel via this triage user interface are stored within error records documenting the error message and its remediation, thereby enabling the error remediation system to provide the remediation to end users who encounter the error message in the future.

As will be understood in view of this disclosure, the error remediation systems and methods provided herein have several advantages over other support automation. For instance, the error remediation systems and methods described herein enable automatic and immediate remediations for error messages without requiring modifications to a monitored application. This can be particularly helpful where the monitored application cannot be modified by the support personnel. Further, the error remediation systems and methods described herein enable support personnel to identify, triage, and remediate errors based on, for example, the number of users affected and/or the severity of the error message. In addition, once a remediation to an error message is established, that remediation is automatically provided to all users who encounter the error message. This can help prevent end users from repetitively encountering, and potentially opening tickets for, the same issues without some form of remediation being provided. Similarly, once an error present within a session recording is triaged, other session recordings including the error are automatically triaged. This helps prevent support personnel from investing duplicative effort manually triaging the errors. Further, by automatically navigating session recordings, the systems and methods described herein eliminate manual errors that sometimes accompany manual triaging of session data.

Through these features, the session triage and error remediation system and methods described herein magnify the positive impact support personnel can provide to the end users they support. Moreover, the error remediation systems and method described herein enable the development or support personnel to input remediations to errors discovered during final regression testing of a release, thereby decreasing the support calls after the release is in production. These and other advantages will be recognized in view of this disclosure.

In certain examples, an error remediation system as disclosed herein operates on data descriptive of UI elements displayed or to be displayed within the user interface of a computer system. For instance, in some examples, the error remediation system detects error messages by monitoring UI elements displayed, or to be displayed, in the UI; identifying changes in the UI elements; and executing a classifier in response to identifying changes in the UI elements. These UI elements can be provided by one or more monitored applications. In some examples, the classifier determines whether the UI, including the changed UI elements, depicts an error message. In these examples, the error remediation system can execute detection operations by processing a wide variety of UI data. Examples of this UI data include hypertext markup language (HTML) descriptive of the UI elements, UI automation messages descriptive of the UI elements, hook messages descriptive of the UI elements, and image data depicting rendered UI elements. The HTML descriptive of the UI elements can be organized within, for example, a document object model (DOM).

The error message detection processes that operate on the UI data can be housed within various components of the error remediation system. For instance, in some examples, these detection processes are housed within a browser plugin or extension. In these examples, the detection processes operate on HTML data to execute the detection operations described herein. For instance, the detection process can scan a DOM including the HTML data. In other examples, the error message detection processes are housed within a browser itself, and thus no plugin or extension is required. In these examples, the error message detection processes operate on HTML data to execute the detection operations described herein. It should be noted that the browser or browser plugin can be executed by a virtual machine hosted by a physical server.

In other examples, the error message detection processes are housed within an application executed by an intermediate device (e.g., an application delivery controller (ADC)) disposed between an application server and an application client. In these examples, the error message detection processes operate on HTML data and/or image data passing between the client application and the server application. In other examples, the error message detection processes are housed within a local process supported by an operating system of a client device that also renders the UI. This local process can execute in the background as an independent process, can execute as part of a virtualization service, and/or can execute as a part of the monitored application that generates the UI. In these examples, the error message detection processes can operate on UI automation messages, hook messages, HTML and/or other UI data generated by the monitored application.

A variety of classifiers can be used to detect error messages within UI data. For instance, in some examples, the error remediation system executes a classifier that scans the UI data, or data derived from the UI data, for keywords associated with error messages. This derived data can include text data output from an optical character recognition (OCR) and/or computer vision processes. In other examples, the classifier executes a machine learning process that operates on input including the UI data and/or data derived from the UI data. In these examples, the machine learning process can be trained to recognize text and/or objects commonly displayed at particular locations when an error message is encountered. In some examples, the error remediation system executes a single classifier for all changes in UI elements. In other examples, the error remediation system executes one or more classifiers that are tailored to specific types of monitored applications.

In some examples, the error remediation system forms, in response to detecting an error message, a signature uniquely identifying the error message. The attributes of a signature can vary between examples and/or types of monitored applications. For instance, where the UI data is HTML data, the signature can include a UI hierarchy derived from a DOM including the HTML data. This UI hierarchy can include a root object and a line of descendant objects that terminates in an object storing the error message. Similarly, where the UI data are UI automation messages and/or hook messages, the signature can include a UI hierarchy that includes a root automation or hook element and a line of descendant automation or hook elements that terminates in an automation or hook element representing the error message.

In certain examples, a signature can include other attributes. For instance, in some examples, the attributes of a signature can include identifiers such as a title, universal resource locator (URL), or host for a page served by a monitored web or SaaS application. Alternatively or additionally, a signature can include a title of window or dialog provided by a local monitored application or a process name associated with the local monitored application. A signature can also include metadata descriptive of the error message, as described further below.

In some examples, the error remediation system provides on-the-fly remediations to previously identified and triaged error messages as and when the error messages are encountered by end users. For instance, in certain examples, the error remediation system uses the signature of an error message encountered by an end user to identify a remediation for the error message. For example, the error remediation system can search for and find an error record that includes the signature and a remediation for the error identified by the signature. In some examples, the error remediation system immediately overlays the error message with a remediation message stored in the identified error record. Alternatively or additionally, the error remediation system can provide the remediation message adjacent to the error message or in a window distinct from the error message. The remediation message can include text describing a work around, including a link to additional resources regarding the error message, etc. Further, in some examples, the error remediation system matches visual characteristics (colors, font, duration, style, etc.) of a remediation message to the overall theme of the user interface. It should be noted that the error remediation system can provide remediations without requiring any changes to the application generating the error message being remediated.

In other examples where the error remediation system is capable of modifying the monitored application, the identified remediation may include a link to an installable package. In these examples, the error remediation system can apply the installable package to the monitored application to remediate the error message. The installable package can include, for example, a patch build with changes to the monitored application and/or information to reconfigure the settings of the monitored application.

In some examples, the error remediation system provides a user interface that enables support personnel to triage and remediate errors encountered by end users. For instance, in some examples, this triage interface tabulates and provides counts and frequencies of error messages grouped by monitored application, customers, regions, sites, etc. In these examples, the triage interface interacts with support personnel to receive input descriptive of remediations. In response to receiving such input, the triage interface stores the remediations in error records that associate the remediations with signatures of error messages to which the remediations apply. Further, in some examples, the triage interface interacts with support personnel to maintain (update and/or rollback) the classifier used to detect error messages. It should be noted that users of the triage interface can include support personnel (e.g., information technology administrators) employed by the same business organization as the end users and/or support personnel employed by a service provider distinct from the employer of the end users. Thus, the triage interface can be widely utilized to the benefit of end users.

The error remediation system can provide the triage interface via a variety of implementation techniques, such as by serving the triage interface via a web server and/or by incorporating and interoperating with a local application. In some examples, the error remediation system exposes an application program interface (API) through which it provides the triage interface. In some examples, the error remediation system hosts the triage interface processes described herein on a server distinct from the other processes executed by the error remediation system. Other implementation techniques for the triage interface will be apparent in view of this disclosure.

In certain examples, a session triage system as disclosed herein operates on session data descriptive of UI elements displayed during an interactive computing session. This interactive computing session can involve communications between a user and a client computer and communications between the client computer and a server computer. In some examples, the session triage system scans the session data to detect changes in UI elements and classifies each detected change as either depicting or not depicting an error message. If the change depicts an error message the session triage system stores an association between the error message and a point in the session data where error message is present. The session triage system later provides access to this point in the session data via a user interface that references the association. By providing this user interface, some examples of the triage system enable support personnel to more easily navigate session recordings including the session data.

In some examples, the session triage system classifies the changes in the UI elements as depicting or not depicting an error message by executing a keyword search on text extracted from image data included in the UI elements. In other examples, the session triage system classifies changes in the UI elements as depicting or not depicting an error message by executing a machine learning process, such as a computer vision process, on image data included within the UI elements.

In some examples, the session triage system generates a summary of session data included within session recordings. This summary can include images of error messages, screenshots including the error message, and session data surrounding the point in the session data where the error message is present. Thus, the summary can include a plurality of images to provide support personnel with additional context for the error message.

In some examples, the session triage system records trace data concurrently with the session data. In these examples, the session triage system can insert error messages encountered within the session data into the trace data, thereby providing an indication within the trace data as to the location of additional diagnostic information surrounding occurrence of the error.

In some examples, the session triage system generates error signatures and uses the error signatures to track occurrences of errors within session recordings. In these examples, the session triage system tabulates a plurality of metrics (e.g., counts, counts by user, counts by business organization, etc.) descriptive of the occurrences of the errors. Further, in these examples, the session triage system provides a user interface that displays the errors and the plurality of metrics that describe occurrences of the errors. The user interface can receive input from support personnel specifying remediations for the errors. In some examples, the session triage system automatically triages session recordings including the error for which remediations are supplied, thereby preventing support personnel from wasting time reviewing already triaged errors within other session recordings.

It should be noted that users of the session triage interface can include support personnel (e.g., information technology administrators) employed by the same business organization as the end users and/or support personnel employed by a service provider distinct from the employer of the end users. Thus, the triage interface can be widely utilized to the benefit of end users.

The session triage system can provide the triage interface via a variety of implementation techniques, such as by serving the triage interface via a web server and/or by incorporating and interoperating with a local application. In some examples, the session triage system exposes an application program interface (API) through which it provides the triage interface. In some examples, the session triage system hosts the triage interface processes described herein on a server distinct from the other processes executed by the session triage system. Other implementation techniques for the triage interface will be apparent in view of this disclosure.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Error Remediation System

In some examples, an error remediation system is configured to identify and timely remediate error messages generated by monitored applications. These monitored applications can include any process capable of displaying information within the UI of a client device, such as locally executed applications, web applications, SaaS applications, and the like. FIG. 1 illustrates a logical architecture of an error remediation system 100 in accordance with some examples. As shown in FIG. 1, the system 100 includes a UI monitor 102, an ER service 104, an error data store 106, a remediator 108, and a triage interface 110.

FIG. 1 further illustrates types of UI data 112 that can be processed by the UI monitor 102 and components that generate the data 112. As shown, the data 112 can include one or more of hook messages 116, UI automation messages 118, and/or HTML 124. The hook messages 116 and UI automation messages 118 are generated from UI related processes executed by a monitored application 114. The HTML 124 originates from a server application 122 and is served to the monitored application 114. In some examples, the HTML 124 is transmitted to the monitor 102 from the server 122 via a gateway process 126 before the HTML 124 is received by the monitored application 114. In other examples, the HTML 124 is transmitted to the monitor 102 by the monitored application 114 after it is received by the monitored application 114.

In some examples, the monitor 102 is configured to receive and process one or more of the hook messages 116, the automation messages 118, and the HTML 124. In other examples, the monitor 102 is configured to process two or more of types of the data 112. In either case, the monitor 102 can be configured to acquire the data 112 using a variety of techniques. For instance, in some examples, the monitor 102 is configured to periodically poll sources (e.g., the monitored application 114, the server application 122, and/or the gateway process 126) of the data 112. In other examples, the monitor 102 is configured to register, with the sources of the data 112, to receive notifications regarding changes to the UI of the monitored application 114.

In some examples, the monitor 102 is configured to identify the error messages within the UI by first identifying changes to the UI and then analyzing those changes to determine whether the changes include an error message. The processes that the monitor 102 is configured to execute to identify the changes to the UI depend on the type of UI data available. For instance, in some examples, the monitor 102 is configured to receive notifications that precisely identify changes to the UI of the monitored application 114. In these examples, to identify the changes to the UI, the monitor 102 is configured to simply parse the notifications and store data descriptive of the changes in memory for subsequent processing.

In other examples, the monitor 102 is configured to construct and/or inspect a time sequence of representations of the UI of the monitored application 114. In these examples, the monitor 102 is configured to identify the changes to the UI by contrasting consecutive representations in the time sequence and recording differences between the consecutive representations. These differences can include elements within a first representation of the UI that have no corresponding elements within a second representation of the UI. The differences can also include elements within the first representation that have corresponding elements within the second representation where the elements and the corresponding elements have differing attributes. As discussed in more detail below with reference to FIG. 2, these representations can include DOMs or representations constructed from UI automation or hook messages.

In some examples, the monitor 102 is configured to determine whether any identified changes to the UI include error messages by executing a classifier. This classifier can be configured according to any of a variety of classification techniques. For instance, in some examples, the monitor 102 is configured to execute a classifier that searches the identified changes for one or more keywords associated with error messages within a user-configurable dictionary. Examples of words that can be included in this dictionary include "failure," "exception," "error," "terminated," "denied," "fatal," and the like. In some examples, the monitor 102 is configured to periodically update the user-configurable dictionary with synonyms via a cloud service API, such as the Thesaurus API. Further, in some examples, the monitor 102 is configured to expose the user-configurable dictionary as a service endpoint. In some examples, the monitor 102 is configured to label an identified change as including an error message where the identified change includes a text value matching a word from the dictionary. Alternatively or additionally, where the identified changes include image data, the monitor 102 can be further configured to execute a classifier that inspects identified changes using OCR and/or computer vision techniques. In these examples, the classifier can be trained to identify text and/or icons within images that are commonly presented in error messages.

In some examples, the monitor 102 is configured to generate a signature that can be used to identify future instances of an error message. In these examples, a signature includes a subset of the representation of the UI of the monitored application 114. For instance, in one example, a signature includes a subset of the representation that begins with a root element and that continues through a line of descendants from the root element to an element identified as an error message. For instance, in one example, a signature includes a set of identifiers comprising an identifier of the monitored application 114, an identifier of a window or page in which the error message is displayed, an identifier of the main process that generated the error message, an identifier of the element in the representation corresponding to the error message, and/or metadata descriptive of the error (e.g., error code, stack trace, process name, business organization, region, etc.).

To illustrate, in one example, the monitored application 114 can be a web application (A1) that executes a main process (P1) that has a main window (W1) with several UI elements (E1, E2, and E3). Within this context, A1 can display an error message within a new window (W2) containing several new UI elements (E4, E5, and E6). Assuming E6 is the error message, the signature can include a UI hierarchy such as A1→P1→W2→E6. Alternatively or additionally, A1 can display an error message within the W1 as element E3. The signature for this error message can include a UI hierarchy such as A1→P1→W1→E3.

In some examples, the monitor 102 is configured to interoperate with the service 104 to store signatures within error records or identify remediations associated with error messages. In these examples, to store signatures or retrieve remediations, the monitor 102 is configured to transmit requests to the service 104. These requests can include the signatures. Further, in these examples, the monitor 102 is configured to receive and process responses to the requests. To process the responses, the monitor 102 is configured to parse the responses to identify acknowledgments or remediations. The acknowledgements can indicate that the service 104 created error records for the signatures in the error data store 106. The remediations can be remediations retrieved by the service 104 from the error data store 106 using the signatures. In these examples, the monitor 102 is configured to transmit the remediations, in response to receiving the same, to the remediator 108.

In certain examples, the monitor 102 is configured to interoperate with the service 104 via one or more intermediate processes (e.g., a virtual delivery agent (VDA) in a virtualized environment). For instance, in some examples where the intermediate process is a VDA, the monitor 102 can be configured to interoperate with a VDA process hosted by the server computer hosting the monitor 102. In these examples, this server-hosted VDA process can communicate via a communication channel (e.g., a virtual channel) with another VDA process hosted by a client device where an end user is accessing a monitored application and the client-hosted VDA process can communicate with the service 104.

This configuration can be particularly advantageous where the client device has sufficient connectivity to interoperate with the service 104, but the server computer does not.

In some examples, the data store 106 is organized to store error records. Each of these error records associates a signature with a remediation by storing an identifier of the signature and an identifier of the remediation within fields of the same record. The data store 106 is also configured to store other data elements associated with signatures and remediations, such as remediation messages and links, signature metadata, and identifiers of monitored applications associated with the error messages and remediations. In some examples, the identifiers of the monitored applications are stored separately from the signatures to enhance system performance.

In some examples, the service 104 is configured to receive and process requests from the monitor 102 to store signatures within error records or identify remediations from error records. In these examples, the service 104 is configured to parse the requests, identify signatures stored in the requests, and search the error data store 106 for error records including the signatures. In some examples, the service 104 is further configured to create error records in the error data store 106 where the service 104 is unable to identify existing error records storing the signatures. In some examples, the service is also configured to retrieve remediations from error records storing the signatures or increment a counter in an error record storing the signature by omitting a remediation. In any case, the service 104 is configured to transmit responses to the monitor 102. The responses can include either retrieved remediations or acknowledgements of the creation/modifications of error records without remediations.

In certain examples, the service 104 is configured to provide the monitor 102 with a local copy of the data store 106 so that the monitor 102 can expeditiously look up remediations associated with the signatures it generates. In these examples, the service 104 can be configured to provide the local copy in response to a request received from the monitor 102 and/or to push the local copy to the monitor 102 during initialization of the error remediation system 100 or in response to an update of the data store 106. In other examples, the monitor 102 is configured to use a two-tiered approach in which the monitor 102 attempts to identify an error record storing a signature within a local copy of the data store 106 and transmits a request to the service 104 to look up the signature where it fails to find the signature in the local copy of the data store 106.

In some examples, the triage interface 110 is configured to provide a user interface to interact with support users. This user interface enables the support users to identify error messages being encountered by end users and specify remediations for the error messages. One example of a user interface screen provided by the triage interface 110 is described further below with reference to FIG. 11.

In some examples, the remediator 108 is configured to receive and process requests from the monitor 102 to provide remediations to error messages. In these examples, the remediator 108 is configured to parse the requests, identify remediations stored in the requests, and apply the remediations. The remediator 108 can be configured to provide any of a variety of remediations to end users. For instance, in some examples, the remediator 108 is configured to deliver remediation messages stored in the remediations. These remediation messages can be displayed in conjunction with (e.g., adjacent to or overlaid upon) the error message. The remediation messages can instruct end users on a workaround for the error identified by the error message. These remediation messages can also include links that provide additional information on how to remediate the error. In other examples, the remediator 108 is configured to apply fixes stored in the remediations that resolve the error.

In some examples, the remediator 108 is configured to alter a DOM including an object representing an error message to include an object representing a remediation message. In at least one of these examples, the remediator 108 is configured to overlay the remediation message onto the error message using either DOM/shadow DOM API methods such as createElement, attachShadow, or the like on the root object of the DOM. In other examples, the remediator 108 is configured to provide the remediation message via other processes, which are described further below with reference to FIG. 9.

Figure 13:
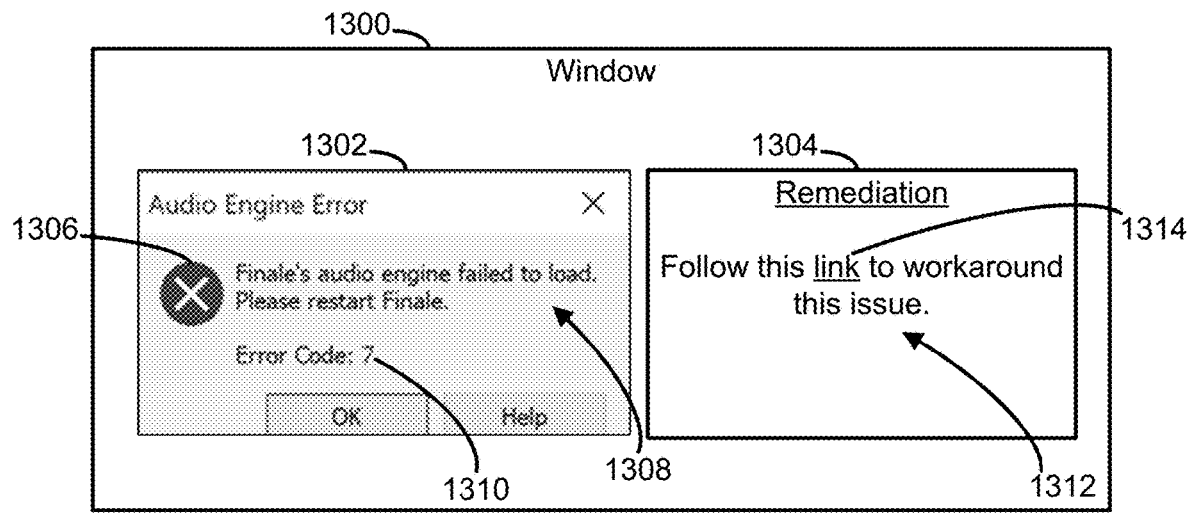
FIG. 13 is a front view of a screen provided by a monitored application and the ER system of FIG. 1 in accordance with an example of the present disclosure.
Figure 14:
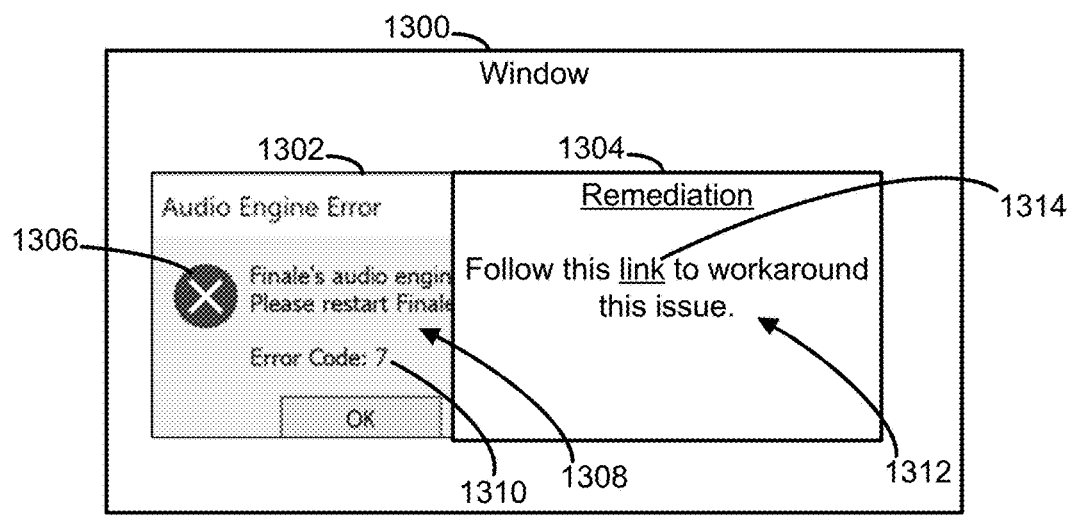
FIG. 14 is a front view of a screen provided by a monitored application and the ER system of FIG. 1 in accordance with an example of the present disclosure.

FIGS. 13 and 14 illustrate a window 1300 presented by one example of the monitored application 114. As shown in FIG. 13, the window 1300 includes an error message dialog 1302 and one form of remediation provided by the remediator 108, a remediation dialog 1304. The error message dialog 1302 includes image data 1306, an error message 1308, and an error code 1310. The remediation dialog 1304 includes a remediation message 1312 and a remediation link 1314. The link 1314 provides access to an article describing a workaround to the error indicated by the error message 1308. As shown in FIG. 13, the remediation dialog 1304 is displayed adjacent to the error message dialog 1302. As shown in FIG. 14, the remediation dialog 1304 partially overlays the error message dialog 1302.

To enable processing of the various types of the data 112, the monitor 102 can implement a system interface through which the monitor 102 requests and/or receives the data 112 via any of a variety of messages. One example of such a system interface is shown in FIG. 2, which illustrates the logical architecture of the monitor 102 in accordance with some examples.

Figure 2:
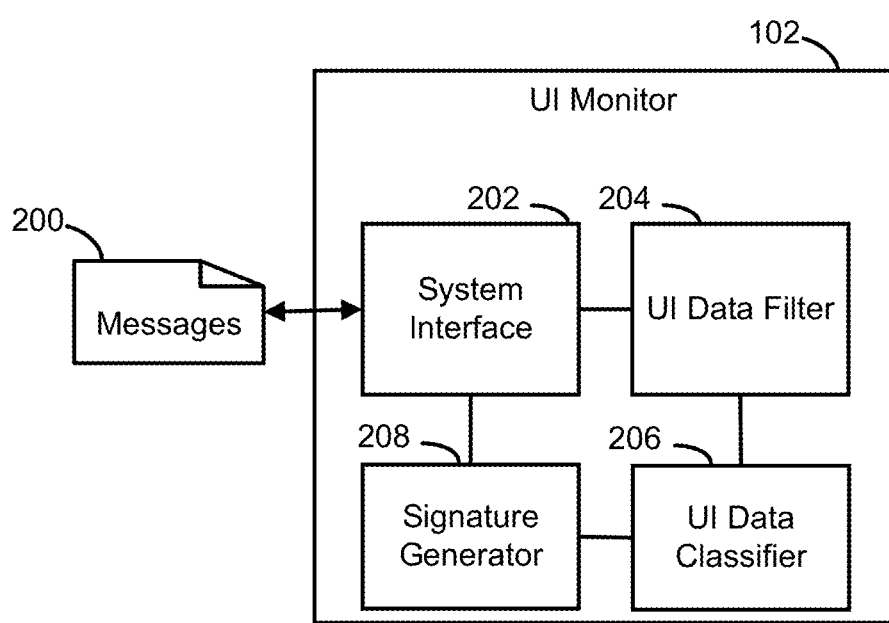
FIG. 2 is a block diagram of a user interface (UI) monitor in accordance with an example of the present disclosure.

As shown in FIG. 2, the monitor 102 of FIG. 1 includes a system interface 202, a UI data filter 204, a UI data classifier 206, and a signature generator 208. In some examples, the system interface 202 is configured to interoperate with various components by exchanging messages 200 with the components. These components can include, for example, an ER service, a remediator, a monitored application and/or a gateway process (e.g., the ER service 104, the remediator 108, the monitored application 114, or the gateway process 126 of FIG. 1). The messages 200 can include the UI data (e.g., the data 112 of FIG. 1), signatures that identify error messages, and other data. The system interface 202 is configured to enable the monitor 102 to interoperate with these various components. As such, the system interface 202 may expose and implement an application program interface (API) and/or transmit and receive messages that conform with the APIs or interfaces of other components.

For instance, in some examples, the system interface 202 is configured to interoperate with a gateway process or a monitored application to request and receive HTML (e.g., the HTML 124 of FIG. 1), which constitutes a description of at least a portion of the UI of the monitored application. In other examples, the system interface 202 is configured to receive, from one or more operating system services, hook messages and/or UI automation messages (e.g., the hook messages 116 and/or the UI automation messages 118 of FIG. 1) descriptive of the operation of monitored application. Further, in some examples, the system interface 202 is configured to interoperate with the ER service by transmitting messages to the ER service that include signatures received from the signature generator 208.

In some examples, the filter 204 is configured to receive the UI data from the system interface 202 and determine whether the UI data includes changes from previously analyzed UI data. In these examples, the filter 204 is further configured to provide, where the UI data includes one or more changes, differences between the UI data and the previously analyzed data to the classifier 206.

The particular configuration of the filter 204 varies with the type of the UI data available to be processed. For instance, in certain examples, the UI data represents a complete screen of the UI of the monitored application. In these examples, the filter 204 is configured to maintain (e.g., in memory) a previous version of UI data to compare against a current version of the UI data to identify differences, which may represent error messages.

In one example, the filter 204 is configured to compare the HTML data to previously received HTML data to determine whether the HTML data includes one or more changed HTML elements. To facilitate comparison of the HTML data and the previously received HTML data, the HTML data can be received and/or stored in a first DOM and the previously received HTML data can be received and/or stored in a second DOM. To identify changed HTML elements, the filter 204 can be configured to scan each DOM from its root object downward and to generate a set of identified objects within the first DOM that have no corresponding object in the second DOM or that have a corresponding object with different attributes in the second DOM. This set of identified objects within the first DOM can represent the one or more changed UI elements.

In some examples, the filter 204 is further configured to remove identified objects that will not be reflected in the UI from the set of identified objects. For instance, in some examples, the filter 204 is configured to access the cascading styles sheets (CSS) attribute of identified objects and remove, from the set of identified objects, any identified objects for which the CSS attribute is set to "none." In other examples, the filter 204 is further configured to call the window.getComputedStyle( ) function to determine whether any HTML elements within the DOM that are applied to an identified object would cause it to not be reflected in the UI. The filter 204 removes any such objects from the set of identified objects. In still other examples, the filter 204 is further configured to assess the zIndex property of identified objects and remove, from the set of identified objects, any members that would not be reflected in the UI due to obstructions caused by other objects. In certain examples, the filter 204 is further configured to provide the filtered set of identified objects to the classifier 206 for subsequent processing.

In another example, the filter 204 is configured to construct a current representation of the UI using the UI automation messages and/or the hook messages and to compare the current representation to a previously constructed representation. In some examples, the filter 204 interoperates with the UI automation and/or hook operating system processes via the system interface 202 to construct the representations used for comparison purposes. More specifically, the filter 204 is configured to construct the representations by enumerating each automation or hook element of the UI and determining, via attributes of each element, whether the element is to be visibly rendered within the UI. Elements that are to be visibly rendered are included in a representation. Elements that are not to be visibly rendered are not included in the representation.

In this example, to identify changed automation or hook elements, the filter 204 can be configured to scan each representation from its root element downward and to generate a set of identified elements within the current representation that have no corresponding element in the previous representation or that have a corresponding element with different attributes in the previous representation. In some examples, the filter 204 is configured to provide the changed elements to the classifier 206 for further processing.

In some examples, the filter 204 is configured to receive, via the system interface 202, notifications that identify the changed DOM objects or automation/hook elements. In these examples, the processing executed by the filter 204 is minimal, as the changed objects or elements are identified within the notifications. To enable the filter 204 to receive notifications that identify the changed objects or elements, the filter 204 is configured to transmit a subscription request to the automation or hook process that monitors the monitored application and/or to the monitored application itself. For instance, in some examples where the monitored application is a browser or includes an embedded browser, the filter 204 is configured to interoperate with the browser via the MutationObserver Web API to subscribe to notifications regarding DOM events. The MutationObserver Web API can provide a set of events together, which allows the filter 204 to operate more efficiently. Each notification provided by the MutationObserver Web API includes details of changed objects. In some examples, the filter 204 is configured to process the details, such as new objects added to the DOM and/or attribute changes to existing objects in the DOM. In a similar fashion, the filter 204 can be configured to subscribe to Windows UI events via the UI Automation Framework API for various types of controls. In these examples, the filter 204 is configured to provide the changed objects or elements to the classifier 206 for further processing. The filter 204 is also configured to take no additional action where no changed objects or elements are identified.

In some examples, the classifier 206 is configured to determine whether changed DOM objects or automation/hook elements represent an error message. In these examples, the classifier 206 is configured to receive the changed objects or elements and to execute one or more classification processes depending on the type of data stored in the objects or elements. For example, to handle a case where the type of data stored in the objects or elements is text data, the classifier 206 is configured to execute a keyword search process to identify whether the text data includes any keywords from the user-configurable dictionary described above with reference to the monitor 102 of FIG. 1. In some examples, the keyword search process is configured to search for literal keywords and text that matches one or more regular expressions stored in metadata associated with the signatures. To handle a situation in which the type of data is image data, the classifier 206 can be configured to execute an OCR process (e.g., transmit a request to an OCR cloud API or execute locally) to extract text from the image data and to execute the keyword search on the extracted text.

Additionally or alternatively, to handle a situation in which the type of data is image data, the classifier 206 can be configured to execute a machine learning process trained to identify features within the image data that are commonly displayed in error messages. For example, the classifier 206 can execute a convolutional neural network trained to detect error messages within image data. In this example, the convolutional neural network can be trained to detect error text and/or other visual objects, such as stop sign icons, warning sign icons, and the like within the image data. It should be noted that the classification techniques described above can be combined in various examples of the classifier 206 in accordance with the principles described herein. The classifier 206 is further configured to provide changed objects or elements that represent an error message to the signature generator 208 for further processing. The classifier 206 is also configured to take no further action where the changed objects or elements do not represent an error message.

In some examples, the signature generator 208 is configured to generate signatures that uniquely identify error messages and to provide the signatures to the system interface 202 for subsequent processing. As described above, each signature can incorporate a subset of the representation of UI of the monitored application. This subset can be a set of identifiers of various DOM objects or automation/hook elements of a UI hierarchy that begins with a root object or element and terminates with an object or element representing an error message. The UI hierarchy can include an identifier of the monitored application, an identifier of a window or page in which the error message is displayed, an identifier of the main process that generated the error message, an identifier of the object or element that represents the error message. In some examples, the identifier of the monitored application can be a name of the monitored application. The identifier of a window or page can be the window title or the page title. The identifier of the main process can be a name of the process and a module path for the monitored application or a URL at which the monitored application can be accessed. The identifier of the object or element can be an object name (and attribute data) and/or an automation identifier, which can ensure the signature is robust with regard to various human language configurations. Examples of object or element structures used to store identifiers can include tuples such as <object type, object id, object class> and <div, #errorId, #errorclass>. By including application and UI hierarchy information within the signature, the signature generator 208 ensures uniqueness of the signature, even across multiple monitored applications, thereby enabling precise and accurate automatic remediations.

In some examples, the signature generator 208 is configured to further identify the object or element within the set of identifiers by including additional information regarding the context of the object or element as rendered in the UI. In these examples, the signature generator 208 is configured to determine coordinates of the error message within the UI through OCR or UI automation messages. The signature generator 208 is further configured to identify rendered UI elements positioned to the left, top, right, and bottom of the error message. The signature generator 208 can be further configured to identify a title of the error message and to store any part of all of this information in the object or element identifier. Adding this additional information to the object or element identifier can be particularly useful when processing error messages displayed within new windows (e.g., dialog messages).

In some examples, the signature generator 208 is configured to include metadata descriptive of the error (e.g., error code, stack trace, process name, business organization, region, etc.) in signatures. This metadata can include user-configurable regular expressions to broaden the text classified by the classifier 206 as an error message.

Figure 3:
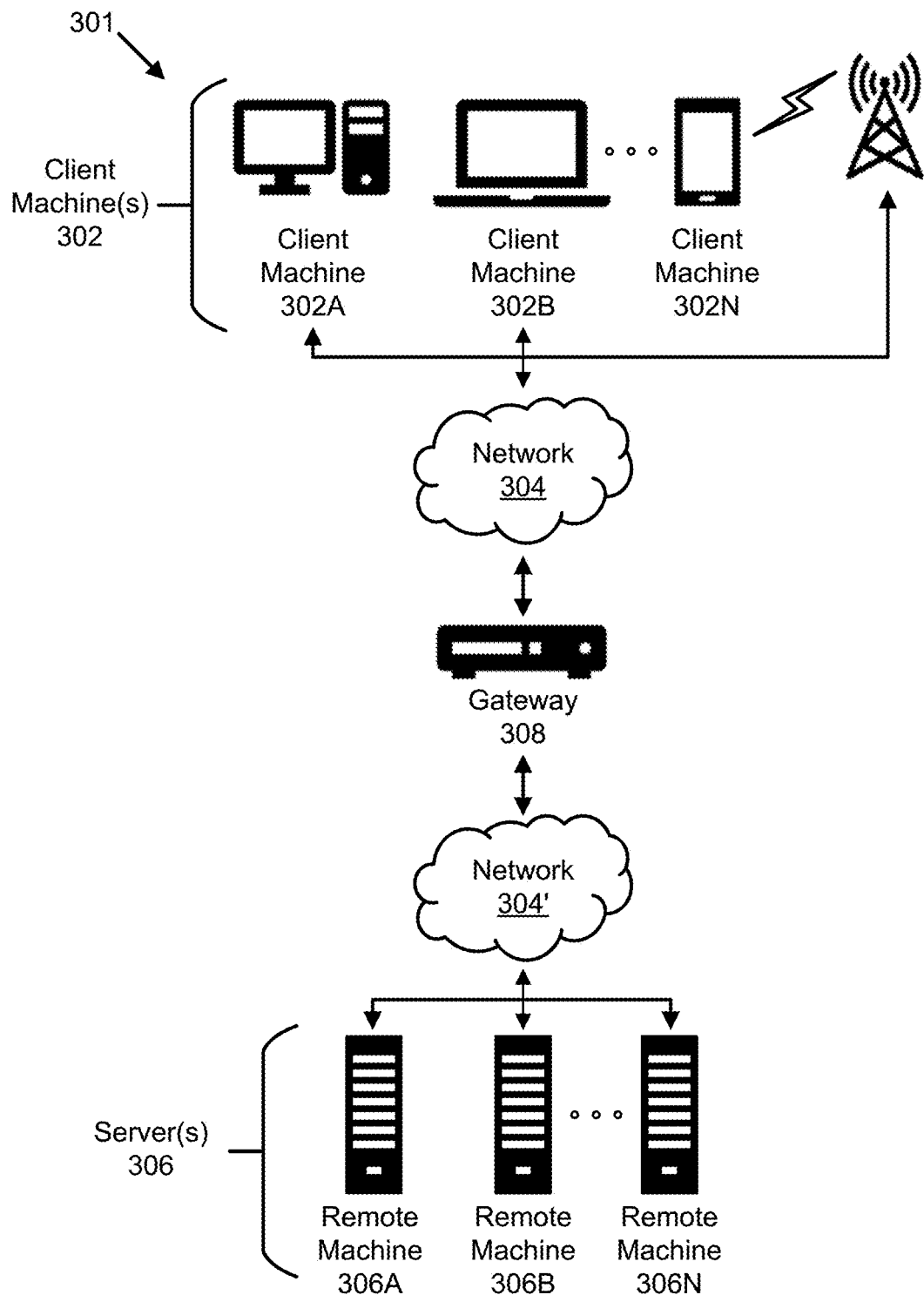
FIG. 3 is a block diagram of a network environment of computing devices in which various aspects of the present disclosure can be implemented.

Referring to FIG. 3, a non-limiting network environment 301 in which various aspects of the disclosure can be implemented includes one or more client machines 302A-302N, one or more remote machines 306A-306N, one or more networks 304, 304', and one or more appliances 308 installed within the computing environment 301. The client machines 302A-302N communicate with the remote machines 306A-306N via the networks 304, 304'. The computing environment 301 can also be referred to as a distributed computer system.

In some examples, the client machines 302A-302N communicate with the remote machines 306A-306N via an intermediary appliance 308. The illustrated appliance 308 is positioned between the networks 304, 304' and may also be referred to as a network interface or gateway. In some examples, the appliance 308 can operate as an ADC to provide clients with access to business applications and other data deployed in a datacenter, the cloud, or delivered as Software as a Service (SaaS) across a range of client devices, and/or provide other functionality such as load balancing, etc. In some examples, multiple appliances 308 can be used, and the appliance(s) 308 can be deployed as part of the network 304 and/or 304'.

The client machines 302A-302N may be generally referred to as client machines 302, local machines 302, clients 302, client nodes 302, client computers 302, client devices 302, computing devices 302, endpoints 302, or endpoint nodes 302. The remote machines 306A-306N may be generally referred to as servers 306 or a server farm 306. In some examples, a client device 302 can have the capacity to function as both a client node seeking access to resources provided by a server 306 and as a server 306 providing access to hosted resources for other client devices 302A-302N. The networks 304, 304' may be generally referred to as a network 304. The networks 304 can be configured in any combination of wired and wireless networks.

A server 306 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 306 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 306 can execute a remote presentation services program or other program that uses a thin client or a remote-display protocol to capture display output generated by an application executing on a server 306 and transmit the application display output to a client device 302.

In yet other examples, a server 306 can execute a virtual machine providing, to a user of a client device 302, access to a computing environment. The client device 302 can be a virtual machine. The virtual machine can be managed by, for example, a hypervisor, a virtual machine manager (VMM), or any other hardware virtualization technique within the server 306.

In some examples, the network 304 can be: a local area network (LAN); a metropolitan area network (MAN); a wide area network (WAN); a primary public network 304; and a primary private network 304. Additional examples can include a network 304 of mobile telephone networks that use various protocols to communicate among mobile devices. For short range communications within a wireless local-area network (WLAN), the protocols can include 802.11, Bluetooth, and Near Field Communication (NFC).

Figure 4:
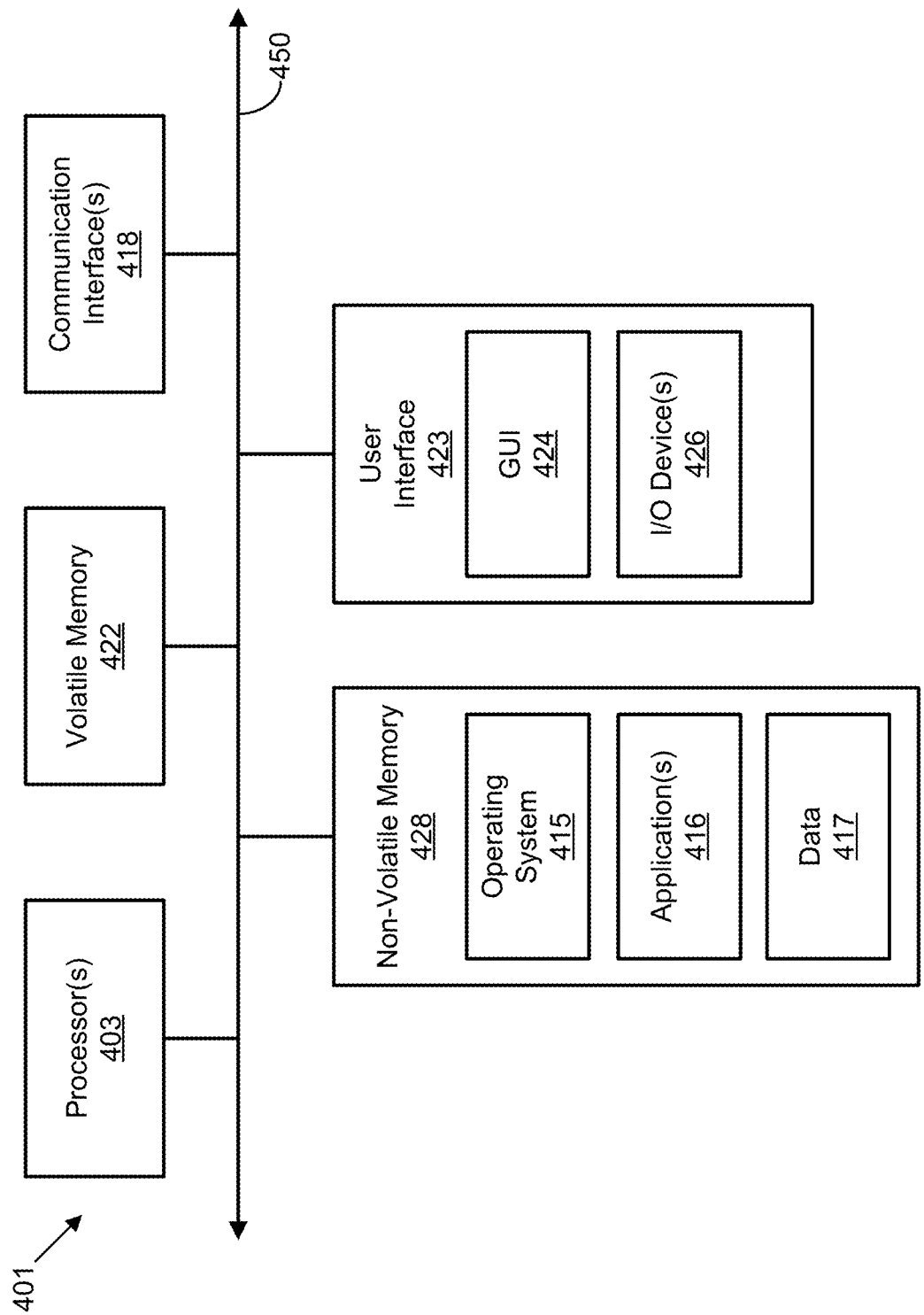
FIG. 4 is a block diagram of a computing device that can implement one or more of the computing devices of FIG. 3 in accordance with an example of the present disclosure.

FIG. 4 depicts a block diagram of a computing device 401 useful for practicing an example of client devices 302, appliances 308 and/or servers 306. The computing device 401 includes one or more processors 403, volatile memory 422 (e.g., random access memory (RAM)), non-volatile memory 428, user interface (UI) 423, one or more communications interfaces 418, and a communications bus 450. The computing device 401 may also be referred to as a computer or a computer system.

The non-volatile memory 428 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 423 can include a graphical user interface (GUI) 424 (e.g., a touchscreen, a display, etc.) and one or more input/output (I/O) devices 426 (e.g., a mouse, a keyboard, a microphone, one or more speakers, one or more cameras, one or more biometric scanners, one or more environmental sensors, and one or more accelerometers, etc.).

The non-volatile memory 428 stores an operating system 415, one or more applications 416, and data 417 such that, for example, computer instructions of the operating system 415 and/or the applications 416 are executed by processor(s) 403 out of the volatile memory 422. In some examples, the volatile memory 422 can include one or more types of RAM and/or a cache memory that can offer a faster response time than a main memory. Data can be entered using an input device of the GUI 424 or received from the I/O device(s) 426. Various elements of the computer 401 can communicate via the communications bus 450.

The illustrated computing device 401 is shown merely as an example client device or server and can be implemented by any computing or processing environment with any type of machine or set of machines that can have suitable hardware and/or software capable of operating as described herein.

The processor(s) 403 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 403 can be analog, digital or mixed. In some examples, the processor 403 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 418 can include one or more interfaces to enable the computing device 401 to access a computer network such as a Local Area Network (LAN), a Wide Area Network (WAN), a Personal Area Network (PAN), or the Internet through a variety of wired and/or wireless connections, including cellular connections.

In described examples, the computing device 401 can execute an application on behalf of a user of a client device. For example, the computing device 401 can execute one or more virtual machines managed by a hypervisor. Each virtual machine can provide an execution session within which applications execute on behalf of a user or a client device, such as a hosted desktop session. The computing device 401 can also execute a terminal services session to provide a hosted desktop environment. The computing device 401 can provide access to a remote computing environment including one or more applications, one or more desktop applications, and one or more desktop sessions in which one or more applications can execute.

Additional descriptions of a computing device 401 configured as a client device 302 or as a server 306, or as an appliance intermediary to a client device 302 and a server 306, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 5:
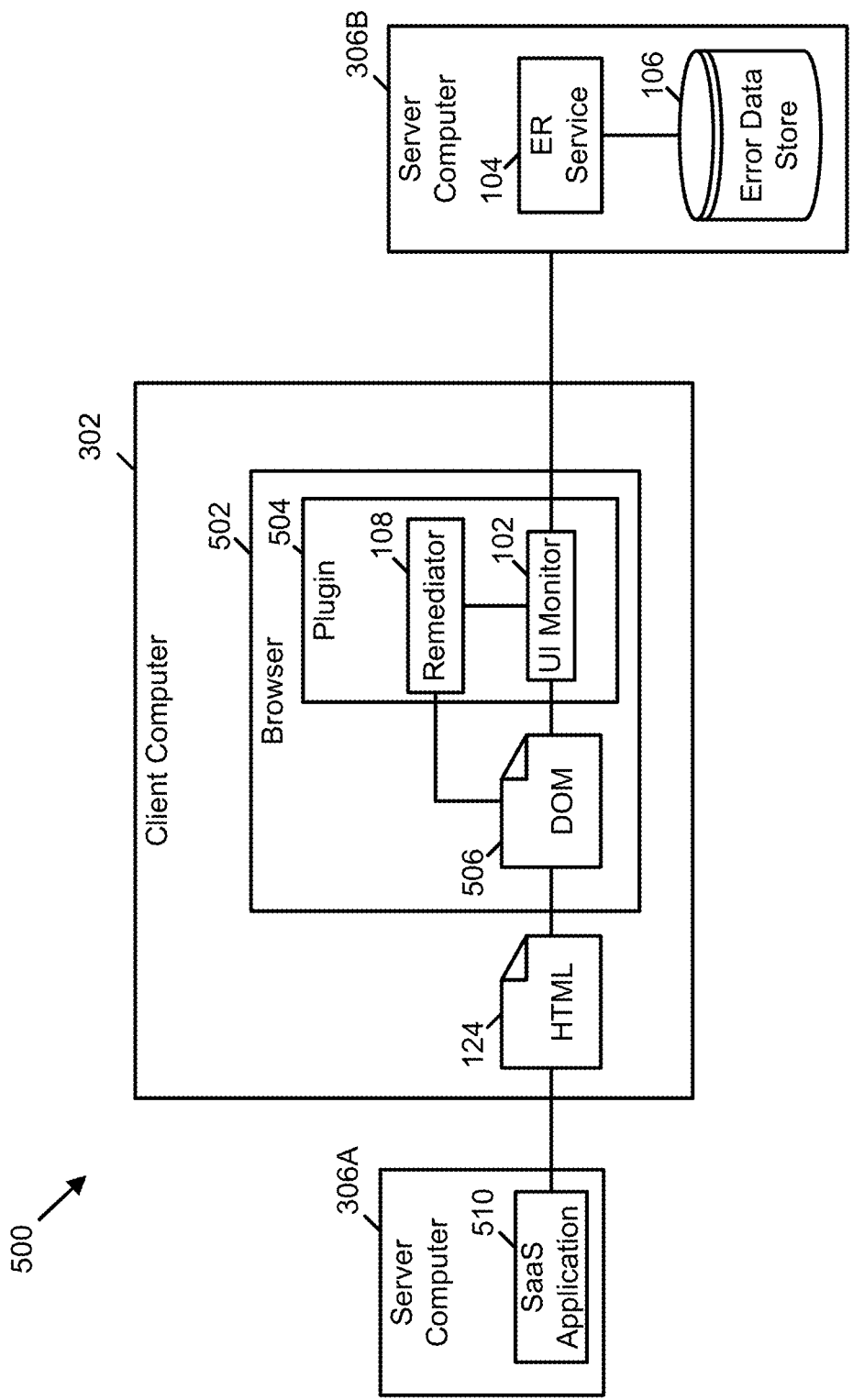
FIG. 5 is a block diagram of the ER system of FIG. 1 as implemented by a specific configuration of computing devices in accordance with an example of the present disclosure.

FIG. 5 illustrates an error remediation system (e.g., the system 100 of FIG. 1) configured for operation within a distributed computing platform (e.g. the network environment 301 of FIG. 3). As shown in FIG. 5, the configuration 500 includes the client computer 302 and the server computers 306A and 306B of FIG. 3. Within the configuration 500, the computer systems 302, 306A, and 306B are communicatively coupled to one another and exchange data via a network (e.g., the networks 304 and/or 304' of FIG. 3).

As shown in FIG. 5, the server 306A is configured to host an SaaS and/or Web application 510. The client 302 is configured to host a browser 502. The server 306B is configured to host the ER service 104 and the error data store 106 of FIG. 1. The browser 502 includes a plugin 504 that includes the remediator 108 and the monitor 102 of FIG. 1. Many of the components illustrated in FIG. 5 are described above with reference to FIGS. 1 and 3. For purposes of brevity, those descriptions will not be repeated here, but each of the components of FIGS. 1 and 3 included in FIG. 5 is configured to function in FIG. 5 as described in FIGS. 1 and 3. However, the descriptions of any of these components may be augmented or clarified below.

As illustrated in FIG. 5, the server 306 is configured to serve the SaaS and/or Web application 510 to the browser 502. As part of this service, the server 306 is configured to transmit the HTML 124 of FIG. 1 to the client 302 using, for example, HyperText Transfer Protocol (HTTP), and the browser 502 is configured to load the HTML 124 into a DOM 506.

In some examples of the configuration 500, the browser 502 is configured to support DOM event notifications. In these examples, the monitor 102 is configured to subscribe to these notifications and to receive and process the notifications to detect changed DOM objects. In other examples of the configuration 500, the browser 502 does not support DOM event notifications. In these examples, the monitor 102 is configured to poll the browser 502 for a copy of the DOM 506 and process a sequence of copies of the DOM to detect changed objects. For instance, in at least one example, to receive a consistent stream of copies to analyze, the monitor 102 is configured to transmit (e.g., via the system interface 202 of FIG. 2) polling requests to the browser 502 on a periodic basis, such as between every two HTTP requests/responses. Regardless of the technique used to detect changed objects, the components of the error remediation system illustrated in FIG. 5 are configured to interoperate to detect error messages represented in the changed objects and provide remediations as described above.

The configuration 500 is but one example of many potential configurations that can be used to implement the system 100. For instance, in some examples, the monitor 102 is configured to provide signatures to the browser 502 rather than the ER service 104. In these examples, the browser 502 is configured to interoperate with the ER service 104 to drive error message detection and remediation. In other examples, the monitor 102 can be configured to communicate signatures to other processes hosted by the client 302. In other examples, the remediator 108 is configured to interoperate with the browser 502 or other process hosted by the client 302 to provide remediations. As such, the examples disclosed herein are not limited to the particular configuration 500 and other configurations are considered to fall within the scope of this disclosure.

Figure 6:
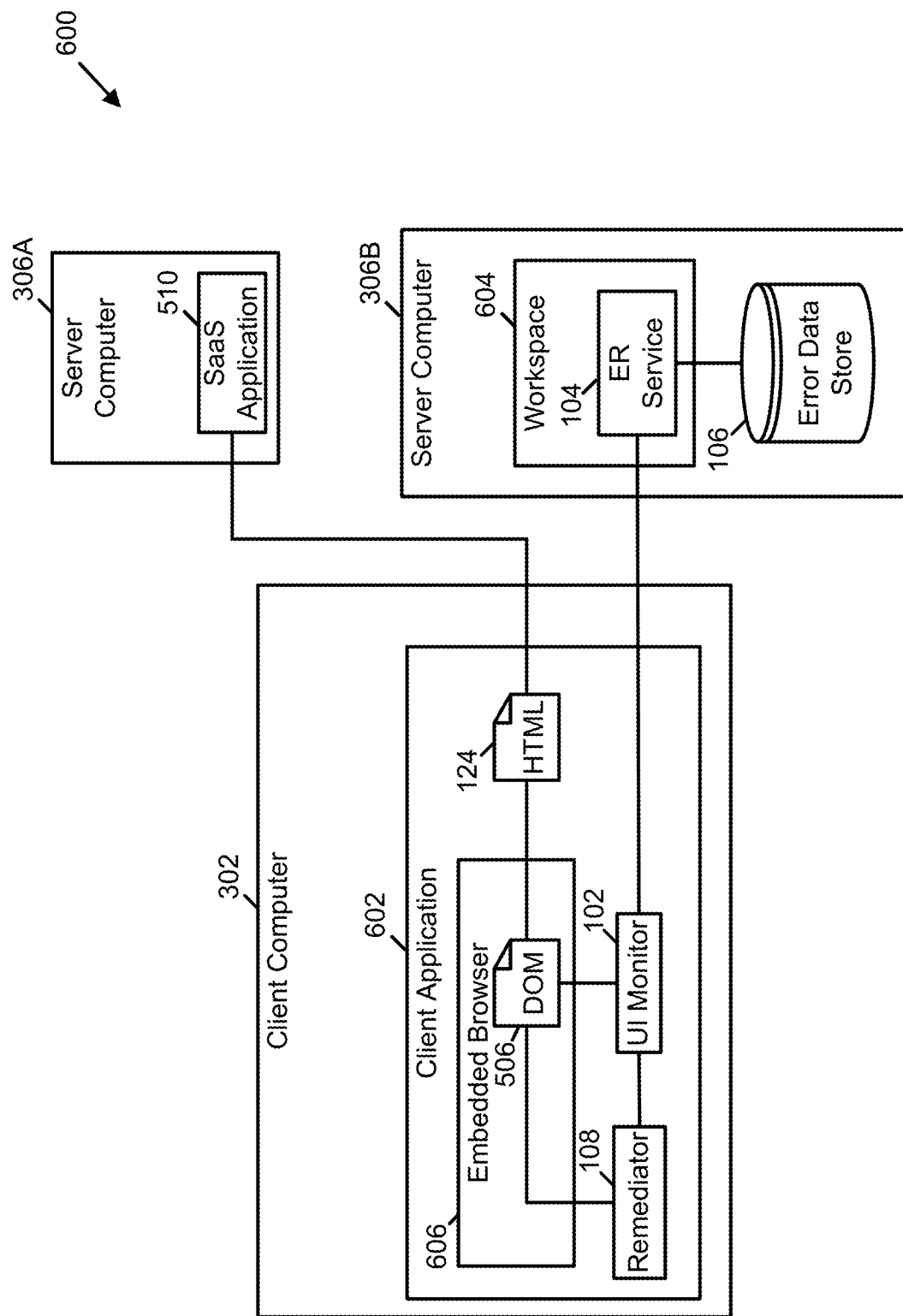
FIG. 6 is a block diagram of the ER system of FIG. 1 as implemented by a specific configuration of computing devices in accordance with an example of the present disclosure.

FIG. 6 illustrates an error remediation system (e.g., the system 100 of FIG. 1) configured for operation within a distributed computing platform (e.g. the network environment 301 of FIG. 3). As shown in FIG. 6, the configuration 600 includes the client computer 302 and the server computers 306A and 306B of FIG. 3. Within the configuration 600, the computer systems 302, 306A, and 306B are communicatively coupled to one another and exchange data via a network (e.g., the networks 304 and/or 304' of FIG. 3).

As shown in FIG. 6, the server 306A is configured to host the SaaS and/or Web application 510 of FIG. 5. The client 302 is configured to host a client application 602. The client application 602 includes an embedded browser 606, the remediator 108 of FIG. 1, and the monitor 102 of FIG. 1. The embedded browser 606 can be implemented, for example, using the Chromium Embedded Framework. The server 306B is configured to host a virtualization workspace service 604 and the error data store 106 of FIG. 1. The workspace service 604 includes, as a service endpoint, the ER service 104 of FIG. 1. Many of the components illustrated in FIG. 6 are described above with reference to FIGS. 1, 3, and 5. For purposes of brevity, those descriptions will not be repeated here, but each of the components of FIGS. 1, 3, and 5 included in FIG. 6 are configured to function in FIG. 6 as described in FIGS. 1, 3, and 5. However, the descriptions of any of these components may be augmented or clarified below.

As illustrated in FIG. 6, the server 306A is configured to serve the SaaS and/or Web application 510 to the client application 602. As part of this service, the server 306A is configured to transmit the HTML 124 of FIG. 1 to the client application 602. The client application 602 is configured to provide the HTML 124 to the embedded browser 606 and the embedded browser 606 is configured to load the HTML 124 into a DOM 506.

In some examples of the configuration 600, the client application 602 is configured to connect to the workspace service 604 during initialization and to update the monitor 102 and/or any of its components (e.g., the system interface 202, the filter 204, the classifier 206, and the signature generator 208 of FIG. 2). In these examples, the client application 602 is configured to provide the SaaS and/or Web application 510 to an end user via the embedded browser 606. The monitor 102 is configured to detect error messages generated by the SaaS and/or Web application 510 during its provision by the client application 602 and to interoperate with the ER service 104 to identify remediations associated with detected error messages. To handle a situation in which a remediation to an error message is identified, the monitor 102 is configured to provide the remediation to the remediator 108. As the remediator 108 has access to the DOM 506 in this configuration, the remediator 108 is configured to alter the DOM 506 to include a remediation message stored in the remediation. Thus, in this configuration, the DOM 506 is configured to cause the error message and the remediation message to be displayed concurrently to the end user.

The configuration 600 is but one example of many potential configurations that can be used to implement the system 100. For instance, in some examples, the monitor 102 is configured to provide signatures to the embedded browser 606 or the client application 602 rather than the ER service 104. In these examples, the embedded browser 606 or the client application 602 is configured to interoperate with the ER service 104 to drive error message detection and remediation in conjunction with the remediator 108. In other examples, the embedded browser 606 includes and/or is extended by the monitor 102. As such, the examples disclosed herein are not limited to the particular configuration 600 and other configurations are considered to fall within the scope of this disclosure.

Figure 7:
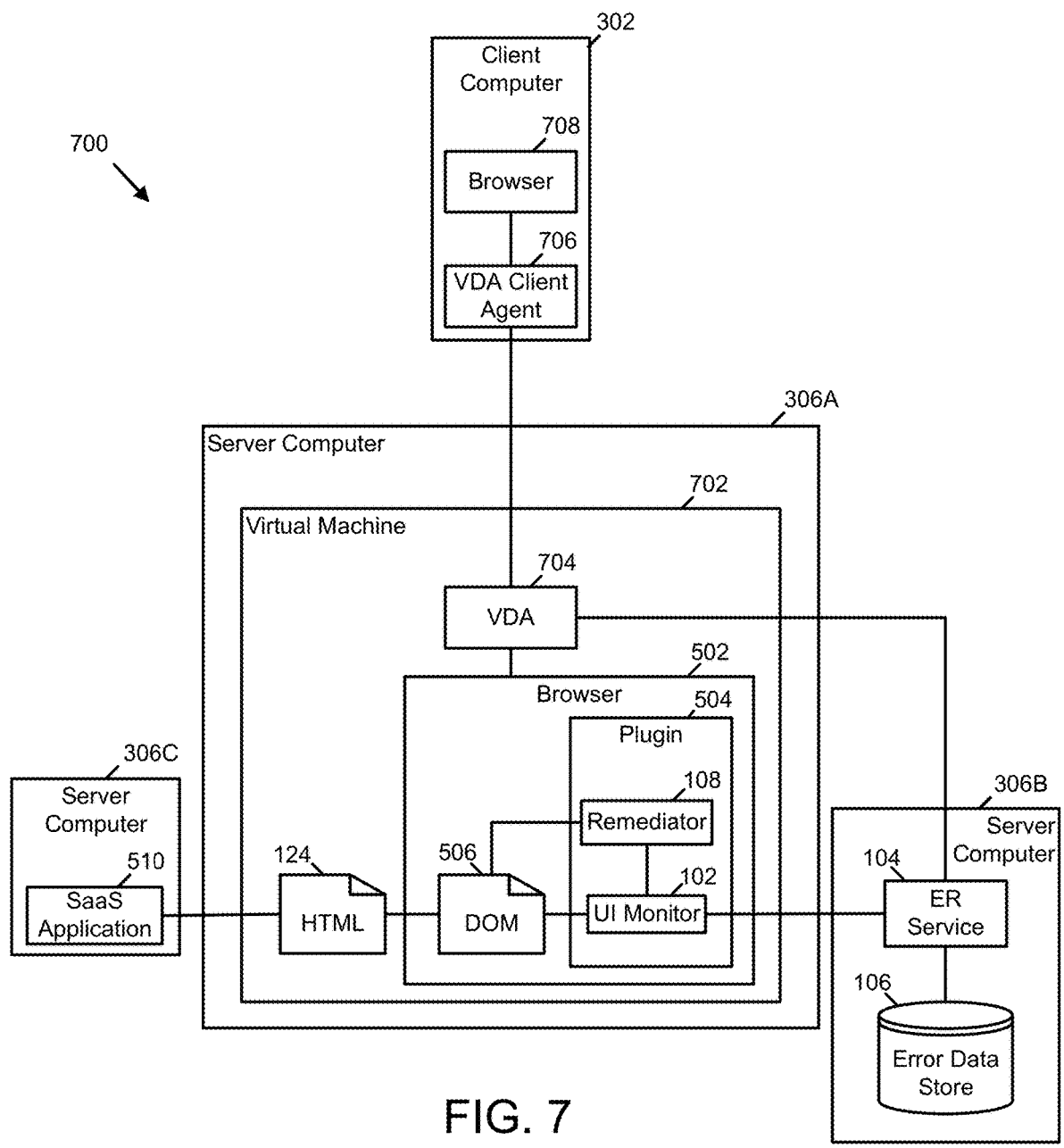
FIG. 7 is a block diagram of the ER system of FIG. 1 as implemented by a specific configuration of computing devices in accordance with an example of the present disclosure.

FIG. 7 illustrates an error remediation system (e.g., the system 100 of FIG. 1) configured for operation within a distributed computing platform (e.g. the network environment 301 of FIG. 3). As shown in FIG. 7, the configuration 700 includes the client computer 302 and the server computers 306A-306C of FIG. 3. Within the configuration 700, the computer systems 302 and 306A-306C are communicatively coupled to one another and exchange data via a network (e.g., the networks 304 and/or 304' of FIG. 3).

As shown in FIG. 7, the server 306C is configured to host the SaaS and/or Web application 510 of FIG. 5. The client 302 is configured to host a browser 708 and a VDA client agent 706. The server 306A is configured to host a virtual machine 702. The virtual machine 702 is configured to host a VDA 704 and the browser 502 of FIG. 5. The VDA 704 and the VDA client agent 706 are configured to establish a virtualization infrastructure between the client 302 and the server 306A. The server 306B is configured to host the ER service 104 and the error data store 106 of FIG. 1. Many of the components illustrated in FIG. 7 are described above with reference to FIGS. 1, 3, and 5. For purposes of brevity, those descriptions will not be repeated here, but each of the components of FIGS. 1, 3, and 5 included in FIG. 7 are configured to function in FIG. 7 as described in FIGS. 1, 3, and 5. However, the descriptions of any of these components may be augmented or clarified below.

As illustrated in FIG. 7, the server 306C is configured to serve the SaaS and/or Web application 510 to the browser 502. As part of this service, the server 306C is configured to transmit the HTML 124 of FIG. 1 to the virtual machine 702. The virtual machine 702 is configured to provide the HTML 124 to the browser 502, and the browser 502 is configured to load the HTML 124 into the DOM 506 of FIG. 5. The components of the error remediation system illustrated in FIG. 7 are configured to interoperate with the browser 502 to detect error messages represented in changed objects and provide remediations as described above. The VDA 704 and the VDA client agent 706 are configured to interoperate to provide the UI of the virtual machine 702 to an end user via the browser 708, thereby providing the end user with secure access to the SaaS and/or Web application 510. In some examples, the VDA 704 and the VDA client agent 706 are further configured to update the monitor 102 and/or any of its components (e.g., the system interface 202, the filter 204, the classifier 206, and the signature generator 208 of FIG. 2) in the background during initialization or on-going operation of the virtual machine 702.

The configuration 700 is but one example of many potential configurations that can be used to implement the system 100. For instance, in some examples, the monitor 102 is configured to provide signatures to the VDA 704 rather than the ER service 104. In these examples, the VDA 704 is configured to interoperate with the ER service 104 to drive error message detection and remediation in conjunction with the remediator 108. More specifically, in some examples, the VDA 704 can be configured to host the remediator 108 and/or the monitor 102. As such, the examples disclosed herein are not limited to the particular configuration 700 and other configurations are considered to fall within the scope of this disclosure.

Figure 8:
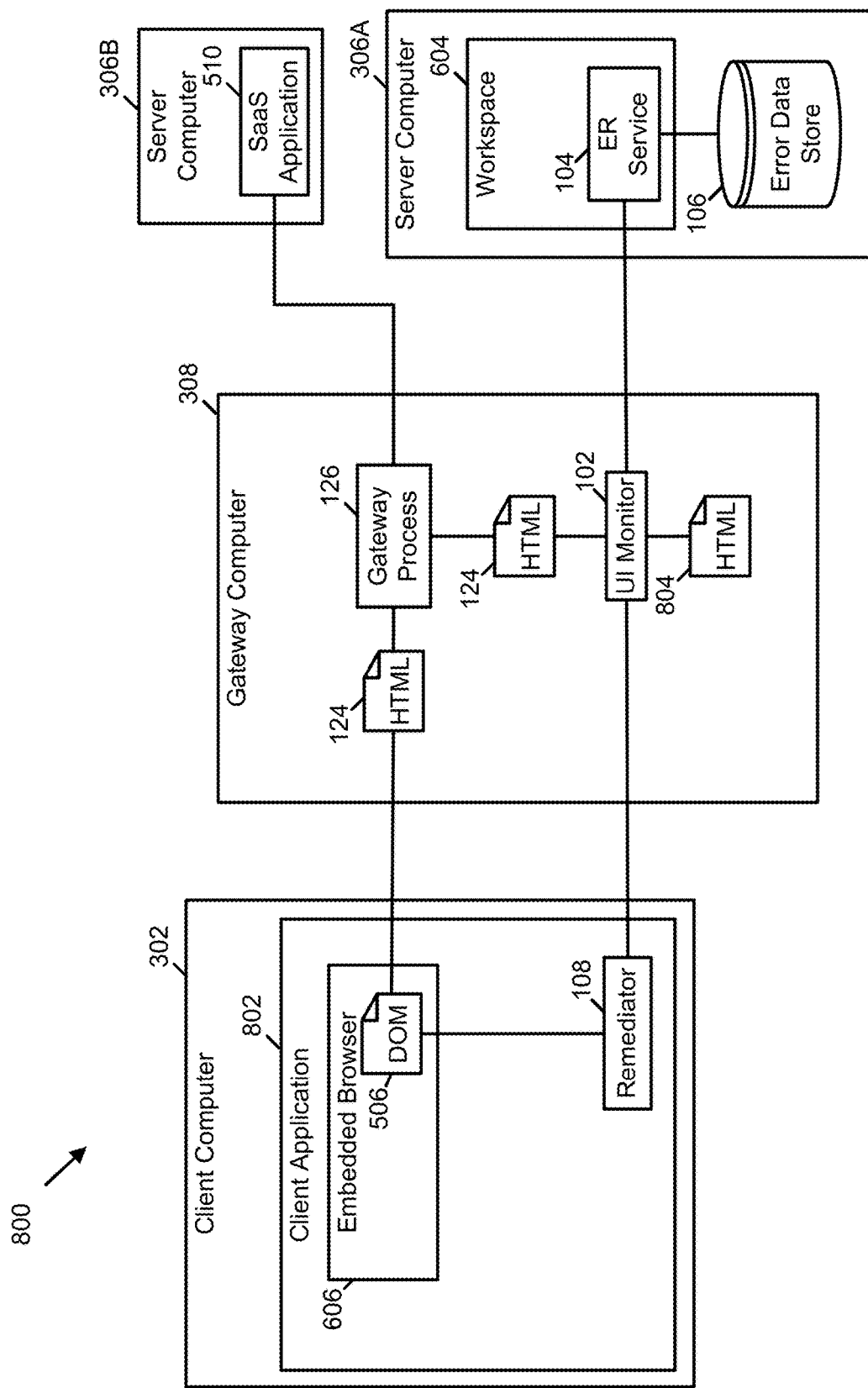
FIG. 8 is a block diagram of the ER system of FIG. 1 as implemented by a specific configuration of computing devices in accordance with an example of the present disclosure.

FIG. 8 illustrates an error remediation system (e.g., the system 100 of FIG. 1) configured for operation within a distributed computing platform (e.g. the network environment 301 of FIG. 3). As shown in FIG. 8, the configuration 800 includes the client computer 302, the server computers 306A and 306B, and the gateway computer 308 of FIG. 3. Within the configuration 800, the computer systems 302, 306A, 306B, and 308 are communicatively coupled to one another and exchange data via a network (e.g., the networks 304 and/or 304' of FIG. 3).

As shown in FIG. 8, the server 306B is configured to host the SaaS and/or Web application 510 of FIG. 5. The server 306A is configured to host the virtualization workspace service 604 of FIG. 6 and the error data store 106 of FIG. 1. The workspace service 604 includes the ER service 104 of FIG. 1. The gateway 308 is configured to host the monitor 102 and the gateway process 126 of FIG. 1. The client 302 is configured to host a client application 802. The client application 802 includes the embedded browser 606 of FIG. 6 and the remediator 108 of FIG. 1. Many of the components illustrated in FIG. 8 are described above with reference to FIGS. 1, 3, 5, and 6. For purposes of brevity, those descriptions will not be repeated here, but each of the components of FIGS. 1, 3, 5, and 6 included in FIG. 8 are configured to function in FIG. 8 as described in FIGS. 1, 3, 5, and 6. However, the descriptions of any of these components may be augmented or clarified below.

As illustrated in FIG. 8, the server 306B and the gateway 308 interoperate to serve the SaaS and/or Web application 510 to the embedded browser 606. The gateway process 126 is configured to update the monitor 102 and/or any of its components (e.g., the system interface 202, the filter 204, the classifier 206, and the signature generator 208 of FIG. 2) prior to serving the SaaS and/or Web application 510. As part of serving the SaaS and/or Web application 510, the server 306B is configured to transmit the HTML 124 of FIG. 1 to the gateway process 126. The gateway process 126 is configured to transmit the HTML 124 the client application 802. The client application 802 is configured to receive the HTML 124 and to load the HTML 124 into the DOM 506 for display to an end user of the client application 802.

Further, in some examples, the gateway process 126 is configured to determine whether the HTML 124 is a response from the SaaS and/or Web application 510 to the embedded browser 606. For instance, in some examples, the gateway process 126 is configured to determine whether the HTML 124 is tagged with the appinstanceID previously assigned to the SaaS and/or Web application 510 by the gateway process 126 when the SaaS and/or Web application 510 was launched. The gateway process 126 is further configured to provide the HTML 124 to the monitor 102 where the HTML 124 is a response from the SaaS and/or Web application 510.

In some examples of the configuration 800, the monitor 102 is configured to compare the HTML 124 to HTML 804 to determine whether the HTML 124 has any changed objects. The HTML 804 is a copy of a previous version of the HTML 124. The monitor 102 is also configured to store a copy of the HTML 124 for future comparative purposes. In some examples, the monitor 102 is also configured to interoperate with the ER service 104 as described above to identify any error messages and corresponding remediations. To handle the situation where a remediation is identified, the monitor 102 interoperates with the remediator 108 to apply the remediation. As the remediator 108 has access to the DOM 506 in this configuration, the remediator 108 is configured to alter the DOM 506 to include a remediation message stored in the remediation. Thus, in this configuration, the DOM 506 is configured to cause the error message and the remediation message to be displayed concurrently to the end user. The monitor 102 is further configured to provide the appinstanceID tag from the HTML 124 to the remediator 108. In cases where there may be multiple concurrent instances of SaaS and/or Web application 510 being displayed by the embedded browser 606, the appinstanceID tag advantageously allows the remediator 108 to apply the remediation to the DOM 506 displaying the corresponding instance of SaaS and/or Web application 510.

The configuration 800 is but one example of many potential configurations that can be used to implement the system 100. As such, the examples disclosed herein are not limited to the particular configuration 800 and other configurations are considered to fall within the scope of this disclosure.

Figure 9:
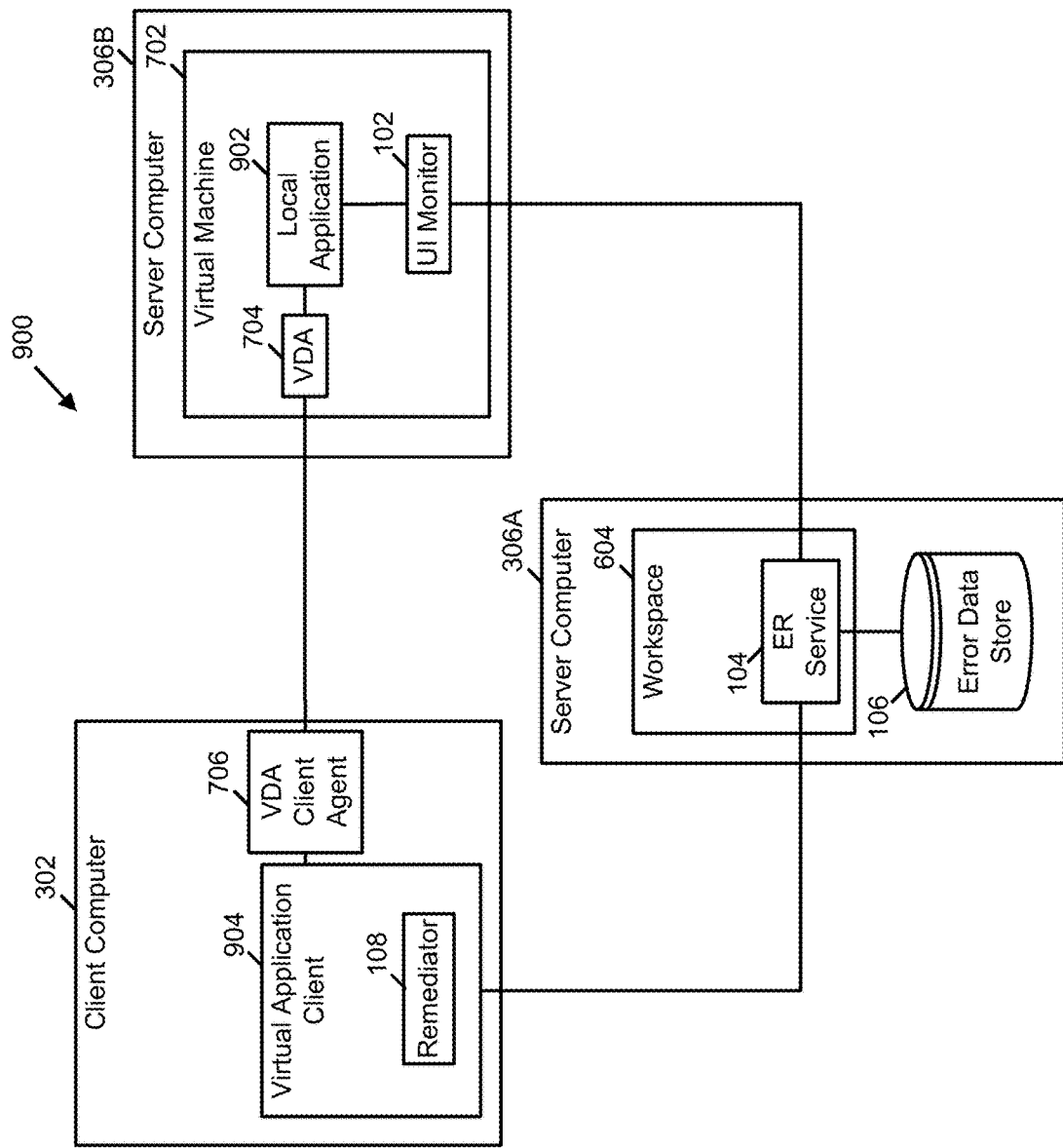
FIG. 9 is a block diagram of the ER system of FIG. 1 as implemented by a specific configuration of computing devices in accordance with an example of the present disclosure.

FIG. 9 illustrates an error remediation system (e.g., the system 100 of FIG. 1) configured for operation within a distributed computing platform (e.g. the network environment 301 of FIG. 3). As shown in FIG. 9, the configuration 900 includes the client computer 302 and the server computers 306A and 306B of FIG. 3. Within the configuration 900, the computer systems 302, 306A, and 306B are communicatively coupled to one another and exchange data via a network (e.g., the networks 304 and/or 304' of FIG. 3).

As shown in FIG. 9, the client 302 is configured to host a virtual application client 904 and the VDA client agent 706. The virtual application client 904 includes the remediator 108 of FIG. 1. The server 306B is configured to host a virtual machine 702. The virtual machine 702 is configured to host a VDA 704, a local application 902, and the monitor 102 of FIG. 1. The VDA 704 and the VDA client agent 706 are configured to establish a virtualization infrastructure between the client 302 and the server 306B. The server 306A is configured to host a virtualization workspace service 604 and the error data store 106 of FIG. 1. The workspace service 604 includes the ER service 104 of FIG. 1. Many of the components illustrated in FIG. 9 are described above with reference to FIGS. 1, 3, 6, and 7. For purposes of brevity, those descriptions will not be repeated here, but each of the components of FIGS. 1, 3, 6, and 7 included in FIG. 9 are configured to function in FIG. 9 as described in FIGS. 1, 3, 6, and 7. However, the descriptions of any of these components may be augmented or clarified below.

As illustrated in FIG. 9, in some examples the virtual application client 904 is configured to provide an end user with a virtual version of the application 902 via the VDA client agent 706 and the VDA 704. In these examples, the virtual application client 904 is configured to transmit via the VDA client agent 706 (e.g., via a virtual channel) a request to the VDA 704 to update the monitor 102 prior to launching the application 902. The VDA 704 is configured to process this request by interoperating with the ER service 104 to update the monitor 102 and/or any of its components (e.g., the system interface 202, the filter 204, the classifier 206, and the signature generator 208 of FIG. 2) and to initiate execution of the monitor 102. In these examples, the monitor 102 is configured to subscribe to UI automation message and/or hook messages descriptive of the UI of the application 902 and to use these messages to detect changed elements, as described above. The monitor 102 is also configured to interoperate with the ER service 104 as described above to identify any error messages and corresponding remediations. To handle the situation where a remediation is identified, the monitor 102 interoperates with the remediator 108, via the virtualization infrastructure established by the VDA client agent 706 and the VDA 704, to apply the remediation. As the remediator 108 is embedded within the virtual application client 904, the remediator 108 is configured to request that the virtual application client 904 present a remediation message stored in the remediation in conjunction with the error message. Alternatively or additionally, the remediator 108 can install a software fix to the virtual application client 904 and/or the VDA client agent 706, where the remediation instructs the same.

The configuration 900 is but one example of many potential configurations that can be used to implement the system 100. For instance, in some examples, the monitor 102 is configured to acquire UI data by loading a hook dynamic link library into the application 902 rather than (or in addition to) via an independent process. In other examples, the monitor 102 is configured to launch a separate, independent global hook process that monitors the application 902. In other examples, the classifier 206 of FIG. 2 is implemented as a virtual component within the monitor 102 that is physically implemented as a service in the workspace 604. In this example, the classifier 206 is configured to expose an API that accepts changed objects or elements as text values and that returns an indication of whether the changed object or element includes an error message. In other examples, the virtual machine 702 is configured to host the remediator 108. In these examples, the remediator 108 is configured to apply remediations to the UI of the application 902 within the virtual machine 702, thereby providing them to the client via the normal processing of the virtualization infrastructure established by the VDA client agent 706 and the VDA 704. As such, the examples disclosed herein are not limited to the particular configuration 900 and other configurations are considered to fall within the scope of this disclosure.

Error Remediation Processes

Figure 10:
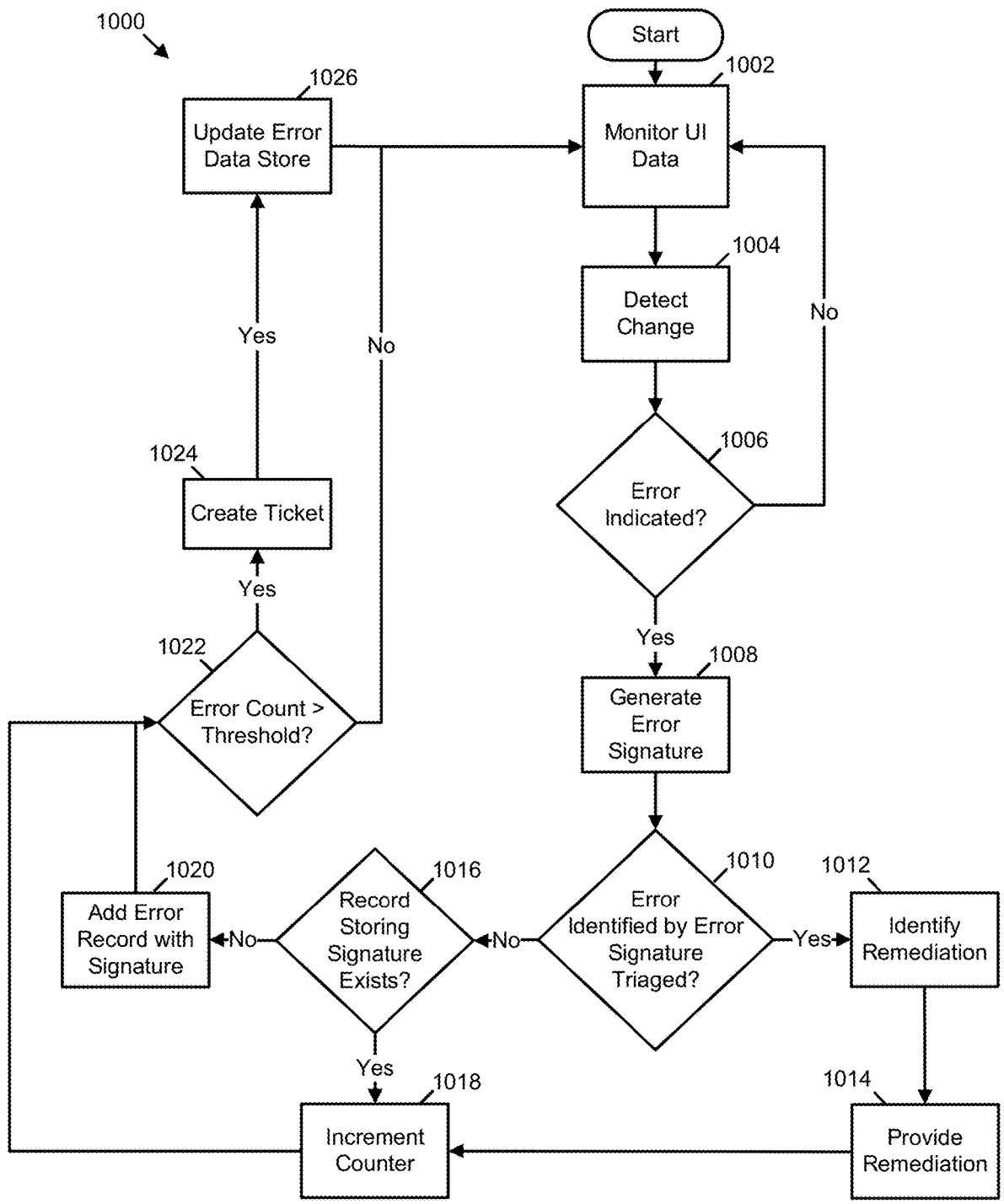
FIG. 10 is a flow diagram of an ER process in accordance with an example of the present disclosure.

As described above, some examples of the system 100 of FIG. 1 are configured to execute error remediation processes. FIG. 10 illustrates an error remediation process 1000 executed by the system 100 in some examples.

The process 1000 starts with a UI monitor (e.g., the UI monitor 102 of FIG. 1) monitoring 1002 the UI of a monitored application. For example, the monitor can subscribe to receive notifications regarding UI data from the monitored application and/or from other system processes (e.g., hook processes and/or UI automation processes) that monitor the monitored application. Alternatively or additionally, the monitor can periodically poll the monitored application and/or other system processes to acquire UI data.

The monitor detects 1004 a change in one or more elements of the UI. For instance, the monitor can execute a filter (e.g., the UI data filter 204 of FIG. 2) that processes the UI data to detect changes therein. In some examples, the notifications received during monitoring 1002 are described of the changes and the filter need only parse them to detect the changes. In other examples, the filter maintains a sequence of representations of the UI and compares members of the sequence to detect changes.

The monitor determines 1006 whether filtered changes indicate the presence of an error message in the UI. For instance, the monitor can execute a classifier (e.g., the UI classifier 206) that classifies the filtered changes as either representing or not representing an error message. The classifier can operate on text and/or image data, as described above. Where the monitor determines 1006 that the filtered changes do not represent an error message, the monitor returns to monitoring 1002 the UI data.

Where the monitor determines 1006 that the filtered changes do represent an error, the monitor generates 1008 an error signature. For instance, the monitor can execute a signature generator (e.g., the signature generator 208 of FIG. 2). The signature can include portions of a representation of a hierarchy of UI elements present in the UI. For instance, the signature can include a root object or element of the UI and a line of descendants of the root terminating in the object or element that represents the error message.

An ER service (e.g., the ER service 104 of FIG. 1) determines 1010 whether the error message has been triaged by support personnel. For instance, the monitor can transmit a request to the ER service that includes the signature. In response, the ER service can search a collection of error records (e.g., the error data store 106) to determine whether a record storing the signature and a remediation exists in the collection. Where the ER service determines 1010 that a record storing the signature and the remediation exists in the collection, the ER service identifies 1012 the remediation by accessing a field in the record storing an identifier of the remediation.

Where the ER service determines 1010 that no record storing the signature and a remediation exists in the collection, the ER service determines 1016 whether a record storing the signature exists in the collection. Where the ER service determines 1016 that a record storing the signature exists in the collection, the ER service increments 1018 one or more counters in the record. For instance the ER service may increment 1018 an instance counter in the record, a user counter (e.g., where a user encountered the error for the first time in this instance), and an organization counter (e.g., where a user associated with a business organization was the first to encounter the error in this instance). In these examples, the error records may be stored in association with lists of users and organizations who have encountered the error. Where the ER service determines 1016 that no record storing the signature exists in the collection, the ER service adds 1020 a record storing the signature to the collection.

A remediator (e.g., the remediator 108 of FIG. 1) provides 1014 the remediation. For instance, the ER service can transmit the remediation to the monitor in response to its early request and the monitor can transmit a request to the remediator to execute the remediation. Alternatively or additionally, the ER service can bypass the monitor and transmit the remediation directly to the remediator. In any case, such provision 1014 can include displaying a remediation message in conjunction with the error message. Alternatively or additionally, such provision can include deploying a fix to a component installed on the system hosting the remediator.

The ER service determines 1022 whether the counter stored in the record has transgressed a user-configurable threshold value (e.g., 1, 5, 10, 20, 50, 100, etc.). Where the ER service determines 1022 that the counter has not transgressed the threshold value, the ER service terminates this instance of processing. Where the ER service determines 1022 that the counter has transgressed the threshold value, the ER service creates 1024 a support ticket (e.g., by transmitting a request to a support automation system) where no ticket or remediation for the error exists. The ER service updates 1026 the collection with the ticket number and terminates this instance of processing.

Processes in accordance with the process 1000 enable the system 100 to detect and quickly remediate errors encountered by end users, as described herein.

Error Triage Interface

Figure 11:
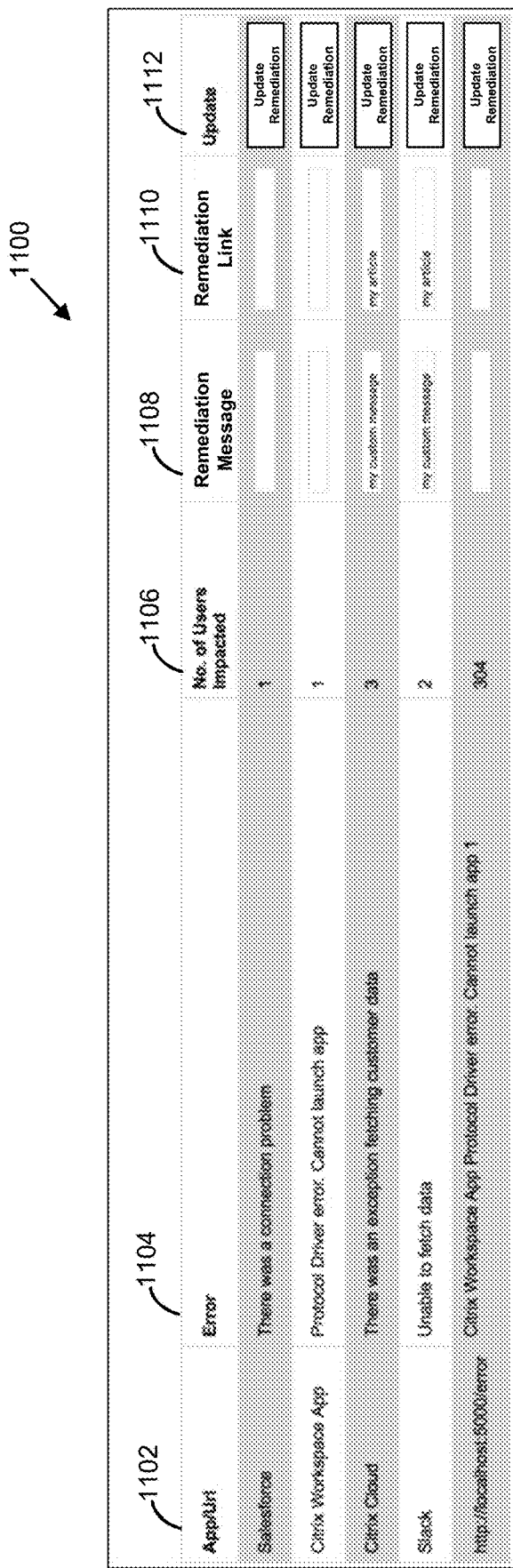
FIG. 11 is a front view of a screen provided by a triage interface in accordance with an example of the present disclosure.

As described above, in various examples disclosed herein, a triage interface (e.g., the triage interface 110 of FIG. 1) provides a user interface to enable support personnel to triage errors encountered by end users and provide remediations to the errors. FIG. 11 illustrates one example of a triage interface screen 1100 provided by one example of the triage interface.

As shown in FIG. 11, the screen 1100 is organized into columns and rows. In some examples, the triage interface is configured to provide a row for each an error record stored in an error data store (e.g., the error data store 106 of FIG. 1), subject to one or more filters. Types of information stored in or associated with an error record that can be used by the triage interface to filter the rows provided in the screen 1100 include business organization, region, site, user, and error message to name a few.

As shown in FIG. 11, the screen 1100 includes an app/URL column 1102, an error column 1104, an impact column 1106, a remediation message column 1108, a remediation link column 1110, and an update column 1112. The app/URL column 1102 includes a set of controls that each display an identifier (e.g., a name) of an app/URL that generated one or more error messages. The error column 1104 includes a set of controls that each display an error message encountered by an end user. The impact column 1106 includes a set of controls that each display a number of end users who have encountered the error message. The remediation message column 1108 includes a set of controls that each are configured to accept text articulating a remediation message to display in conjunction with the error message. The remediation link column 1110 includes a set of controls that each are configured to accept text articulating a hyperlink to display in conjunction with the error message. The hyperlink can, for example, link to an article describing a workaround for the error or a fix for the error. The update column 1112 includes a set of controls that are configured to be selectable via input. In some examples, selection of a control in the column 1112 selects the row including the selected control.

Figure 12:
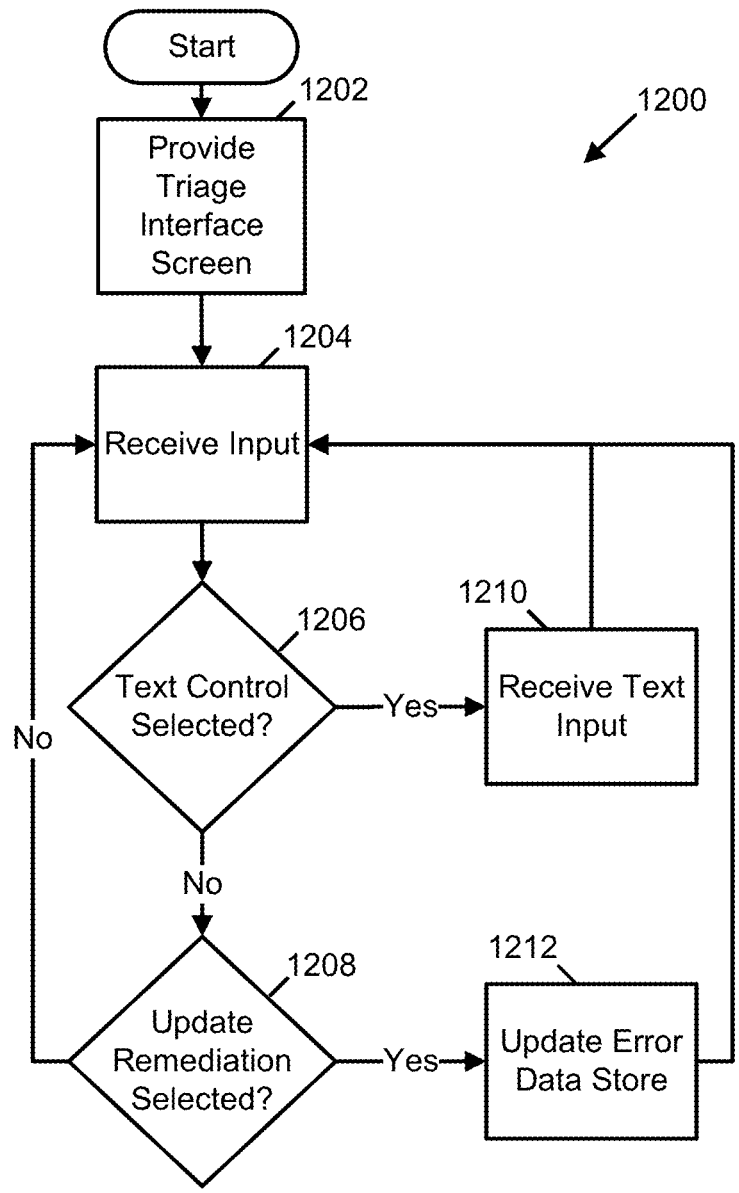
FIG. 12 is a flow diagram illustrating a triage process in accordance with an example of the present disclosure.

In some examples, a triage interface is configured to execute a triage process using the screen 1100. One example of a triage process 1200 in accordance with these examples is illustrated in FIG. 12. As shown in FIG. 12, the process 1200 starts with the triage interface providing 1202 a triage interface screen (e.g., the screen 1100 of FIG. 11). The triage interface receives 1204 input (e.g., a selection of a control of the interface screen). The triage interface determines 1206 whether a text control (e.g., a control from either column 1108 or column 1110) was selected.

Where the triage interface determines 1206 that a text control was selected, the triage interface receives 1210 text input and stores that input in the selected control. Where the triage interface determines 1206 that a text control was not selected, the triage interface determines 1208 whether an update control (e.g. a control from column 1112) was selected.

Where the triage interface determines 1208 that an update control was not selected, the triage interface returns to receiving 1204 input. Where the triage interface determines 1208 that an update control was selected, the triage interface updates 1212 an error record associated with the selected row. In executing the update, the triage interface replaces the values in the error record with the contents of the text controls in the selected row.

Session Triage System

Figure 15:
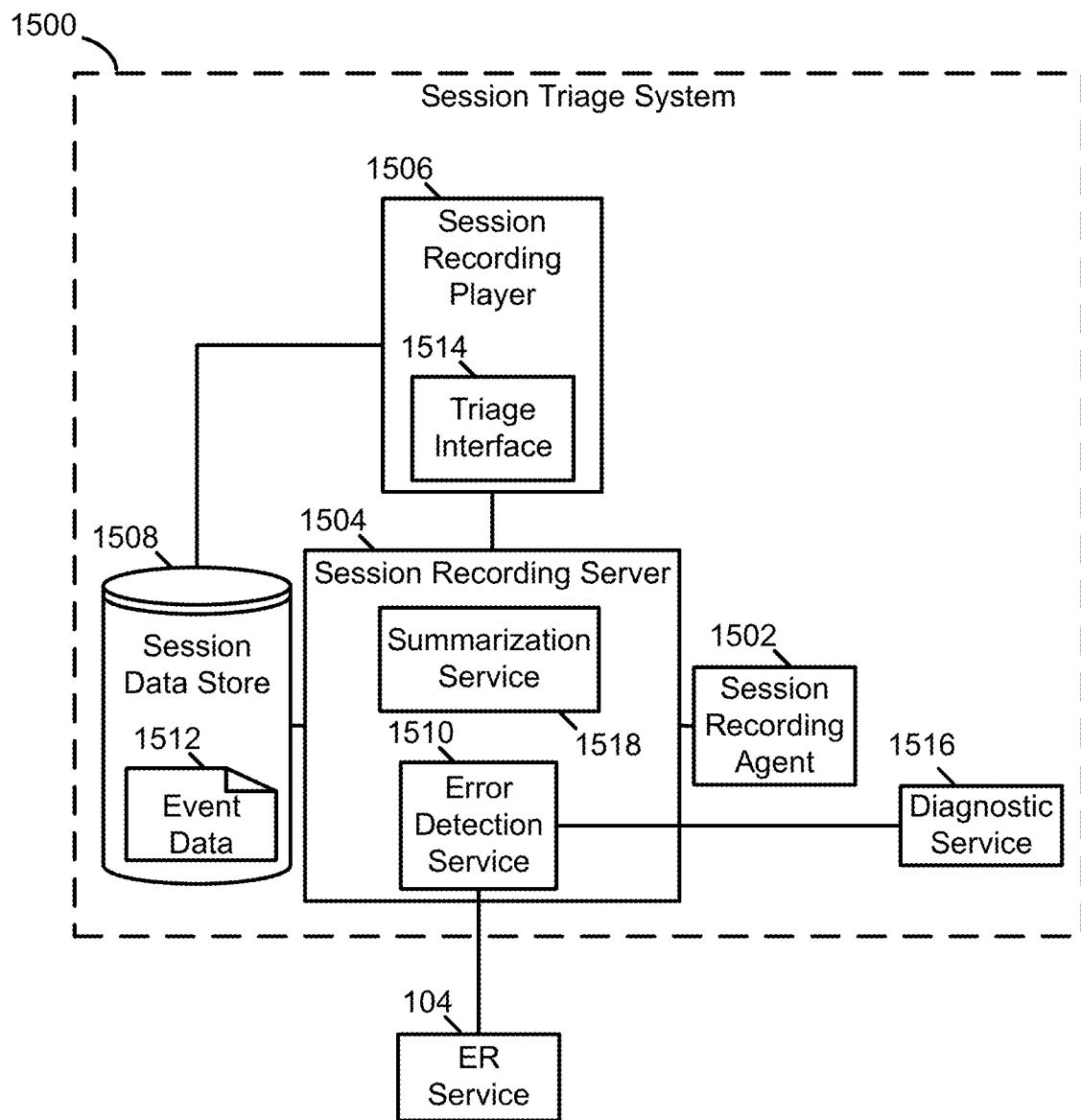
FIG. 15 is a block diagram of a session triage system in accordance with an example of the present disclosure.

In some examples, a session triage system is configured to identify, within live or recorded session data, events in need of triage by support personnel. These events can include error messages and other events that a session recording system is configured to identify and present for triage. In some examples, the error messages can be displayed by applications (e.g., the monitored application 114 of FIG. 1) within an interactive computing session described by the session data. The monitored applications can include any process capable of displaying information within the UI of a client device, such as locally executed applications, web applications, SaaS applications, and the like. FIG. 15 illustrates a logical architecture of a session triage system 1500 in accordance with some examples. As shown in FIG. 15, the system 1500 includes a session recording agent 1502, a session recording server 1504, a session recording player 1506, a session data store 1508, and a diagnostic service 1516. The recording server 1504 hosts an error detection service 1510 and a summarization service 1518. The session player 1506 hosts a session triage interface 1514. The data store 1508 includes event data 1512.

FIG. 15 further illustrates the ER service 104 of FIG. 1. For purposes of brevity, the description of the ER service 104 is not repeated here, but the ER service 104 is configured to function in FIG. 15 as described in FIG. 1. The description of the ER service 104, however, may be augmented or clarified below.

In some examples, the detection service 1510 is configured to detect and record error messages present within session data by acquiring and processing the session data. This session data can include independent computing architecture (ICA) data that is descriptive of a plurality of interactive computing sessions. The detection service 1510 can be configured to acquire the session data using a variety of techniques. For instance, in some examples, the detection service 1510 is configured to acquire session data by registering, with the recording server 1504, to receive live session data as it is generated by, and received from, the agent 1502. These examples will be described further below.

In other examples, the detection service 1510 is configured to acquire session data by retrieving session recordings including the session data from the data store 1508. More specifically, in these examples, the detection service 1510 is configured to retrieve the session recordings in response to a system generated message, such as expiration of a timer or receipt of a new session recording (e.g., via an upload to the session recording server 1504). To handle either case, the detection service 1510 can be configured to poll the data store 1508 for any new session recordings generated by the agent 1502, and stored in the data store 1508, by the recording server 1504, since the last successful polling operation.

In some examples, the data store 1508 is organized to associate each recording of a session of the plurality of interactive computing sessions with a corresponding set of session data. The session data can describe operations executed within an interactive computing session between a client and a server. Examples of the operations that can be recorded in fields within the session data include I/O operations (e.g., keyboard and/or a mouse input, video and audio output, writes to and reads from file and registry storage, etc.), processing operations (e.g., threads/processes executed and/or terminated), security operations (user login, security exceptions, etc.), and the like.

In certain examples, the data store 1508 is further organized to associate each recording with a corresponding subset of the event data 1512. The event data 1512 can describe errors and other system events of interest to support personnel. For instance, the event data 1512 can include attributes of errors encountered by end users within session recordings. Examples of attributes of errors that can be stored in fields within the event data 1512 include a signature generated for the error, the text included in the error message, the triage status of the error, a timestamp indicating when the error message was displayed within its corresponding session recording, and image data including the error message. Additionally or alternatively, the event data 1512 can include attributes of events other than errors that occur within session recordings. Examples of the attributes of other events that can be stored within the event data 1512 include identifiers of files and/or registry keys accessed during the session recording, identifiers of security exceptions raised within the session recording, a timestamp indicating when the event was identified within the session recording, and a triage status of the event (e.g., where the event is a security exception or some other event that needs to be triaged). It should be noted that, in some examples, non-error events are generated by interoperation between the agent 1502 and the recording server 1504 as part of their normal operations.

In some examples, the data store 1508 can be further organized to store additional metadata descriptive of each session recording. For instance, in certain examples, the data store 1508 includes fields that store an overall triage status for each session recording, an identifier of the user interacting with the computer system in the session recording, an identifier of a business organization associated with the end user, and any applications that generated error messages within the session recording. In some examples, the overall triage status can indicate whether the session recording has been triaged. Values stored in the overall triage status field can indicate that none of the events associated with the session recording have been triaged (i.e., the overall triage status is not started), at least some of the events associated with the session recording have been triaged (i.e., the overall triage status is in progress), or all of the events associated with the session recording have been triaged (i.e., the overall triage status is complete).

In some examples, the values stored in the overall triage status can indicate a brief summary, where the overall triage status is in progress. For instance, in some of these examples, this brief summary can indicate a number of events associated with the session recording that have been triaged as compared to the total number of events associated with the session recording. In other examples, the brief summary can indicate a number of events associated with the session recording that are pending triage as compared to the total number of events associated with the session recording. Further, in some examples, the brief summary can indicate a number of events associated with the session recording that are pending triage as compared to a total number of events associated with the session recording that share some commonality with the number of events. For instance, the brief summary can indicate that N of M security events are pending triage (or have been triaged).

In some examples, the detection service 1510 is configured to identify error messages within the session data by first identifying changes to image data stored within the session data and then analyzing those changes to determine whether the changes include an error message. In certain examples, the detection service 1510 is configured to construct and/or inspect a time sequence of one or more UIs executing within the session. The detection service 1510 can be configured to identify the changes to the UIs by contrasting consecutive frames of the image data and recording differences between the consecutive frames. These differences can include, for example, UI elements added between consecutive frames. In other examples where the session data expressly specifies image data that has changed between consecutive frames, the detection service 1510 is configured to simply parse the session data to identify changes to image data.

In some examples, the detection service 1510 is configured to determine whether any identified changes include error messages by executing a classifier. This classifier can be configured according to any of a variety of classification techniques. For instance, in some examples, the detection service 1510 is configured to execute a classifier that inspects the identified changes using an OCR process and searches any text identified by the OCR process for one or more keywords associated with error messages within a user-configurable dictionary. Examples of words that can be included in this dictionary include "failure," "exception," "error," "terminated," "denied," "fatal," and the like. In some examples, the detection service 1510 is configured to periodically update the user-configurable dictionary with synonyms via a cloud service API, such as the Thesaurus API. Further, in some examples, the detection service 1510 is configured to expose the user-configurable dictionary as a service endpoint. In some examples, the detection service 1510 is configured to label an identified change as including an error message where the identified change includes a text value matching a word from the dictionary. Alternatively or additionally, the detection service 1510 can be configured to execute a classifier trained to identify text and/or icons within images that are commonly presented in error messages.

In some examples, the detection service 1510 is configured to generate a signature that can be used to identify future instances of an error message. This signature can be similar to, or the same as, a signature that would be generated by the monitor and can be generated from processed image data and/or other portions of session data. In some examples, the signature includes a representation of a hierarchy of UI elements. This UI hierarchy can include a representation of a root UI element and can continue through a line of descendants from the root UI element to the error message. For instance, in one example, the hierarchy includes a set of identifiers comprising an identifier of an application, an identifier of a window or page of the application in which the error message was displayed, an identifier of the main process that generated the error message, and/or an identifier of the error message (error code, error message text, hash generated from any combination of the error code, error text, etc.).

To illustrate, in one example, the monitored application 114 can be a web application (A1) that executes a main process (P1) that has a main window (W1) with several UI elements (E1, E2, and E3). Within this context, A1 can display an error message within a new window (W2) containing several new UI elements (E4, E5, and E6). Assuming E6 is the error message, the signature can include a UI hierarchy such as A1→P1→W2→E6. Alternatively or additionally, A1 can display an error message within the W1 as element E3. The signature for this error message can include a UI hierarchy such as A1→P1→W1→E3.

In some examples, the detection service 1510 is configured to interoperate with the ER service 104 to store signatures within error records or identify remediations associated with error messages. In these examples, to store signatures or retrieve remediations, the detection service 1510 is configured to transmit requests to the ER service 104. These requests can include the signatures. Further, in these examples, the detection service 1510 is configured to receive and process responses to the requests. To process the responses, the detection service 1510 is configured to parse the responses to identify acknowledgments or remediations. Acknowledgements indicate the error messages associated with the signatures are untriaged. Remediations indicate that the error message associated with the signatures are already triaged.

In certain examples, to handle identified acknowledgements received from the ER service 104, the detection service 1510 is configured to store one or more portions of event data 1512 descriptive of the acknowledged error message in association with a point in the session data at which the acknowledged error message is recorded. These portions of the event data 1512 can include the signature generated for the acknowledged error message, the text included in the acknowledged error message, the triage status of the acknowledged error message (e.g., not started), a timestamp indicating when the acknowledged error message was displayed within the session recording, and/or image data including the acknowledged error message. To handle identified remediations, the detection service 1510 is configured to terminate further processing of the error message, as the error message has already been triaged where a remediation exists within the error data store. It should be noted, however, that the detection server 1510 will continue processing subsequent session data as described herein.

As described above, in some examples, the detection service 1510 is configured to acquire session data by registering, with the recording server 1504, to receive live session data associated with a session as the session data is generated by the agent 1502. In these examples, the detection service 1510 is configured to receive a stream of messages including the session data from the recording server 1504. To handle these messages, the detection service 1510 is configured to parse the messages, extract the session data, and process the session data as described above to detect and record error messages present within the session data.

In some examples, the detection service 1510 is further configured to generate and transmit, to the diagnostic service 1516, messages including data descriptive error messages. This diagnostic data can include, for example, a prefix designating the subsequent data as pertaining to an error message (e.g., "SRErrorProcessing") and the error message itself (e.g., rendered as text and/or image data). In some examples, the message is a Citrix Diagnostic Facility (CDF) trace entry that the diagnostic service 1516 is configured to process and store within a CDF trace at a location corresponding to the time at which the error message was displayed in the session. This feature enables support personnel to navigate directly to the point in the trace that corresponds to the rendering of the error message within the UI, which can increase the efficiency of troubleshooting activities performed by the support personnel. It should be noted that the diagnostic service 1516 can be hosted on the same computer system as the session recording agent 1502. However, this is not a requirement, and in some examples, the diagnostic service 1516 and the session recording agent 1502 can be hosted by different computer systems.

In some examples, the agent 1502 is configured to record session data and to transmit messages including the session data to the recording server 1504. In these examples, the recording server 1504 can be configured to receive these messages, parse the messages, and store the session data the messages contain in the session data store 1508. The recording server 1504 can be further configured to include the received messages in the stream of messages to the detection service 1510 described above, where the detection service 1510 previously registered to receive live session data for the session.

In some examples, the session recording player 1506 is configured to retrieve session data from the data store 1508 and play back the session associated with the session data so that support personnel can diagnose issues encountered by an end user during the session. As shown in FIG. 15, the player 1506 can include the session triage interface 1514. The session triage interface 1514 is configured to provide a user interface to interact with support personnel. This user interface enables the support personnel to identify error messages being encountered by end users and triage identified error messages by specifying remediations for the error messages. One example of a user interface screen provided by the session triage interface 1514 is described further below.

In some examples, the summarization service 1518 is configured to process requests to summarize session recordings. In these examples, the summarization service determines whether a particular session recording is large enough to warrant summarization and, if so, iteratively generates snippets for each event associated with the session recording. An example of a summarization process executed by the summarization service 1518 in some examples is described further below with reference to FIG. 22.

To enable interoperation with the various components of the system 1500, the detection service 1510 can implement a system interface through which the detection service 1510 requests and/or receives any of a variety of messages. One example of such a system interface is shown in FIG. 16, which illustrates the logical architecture of the detection service 1510 in accordance with some examples.

Figure 16:
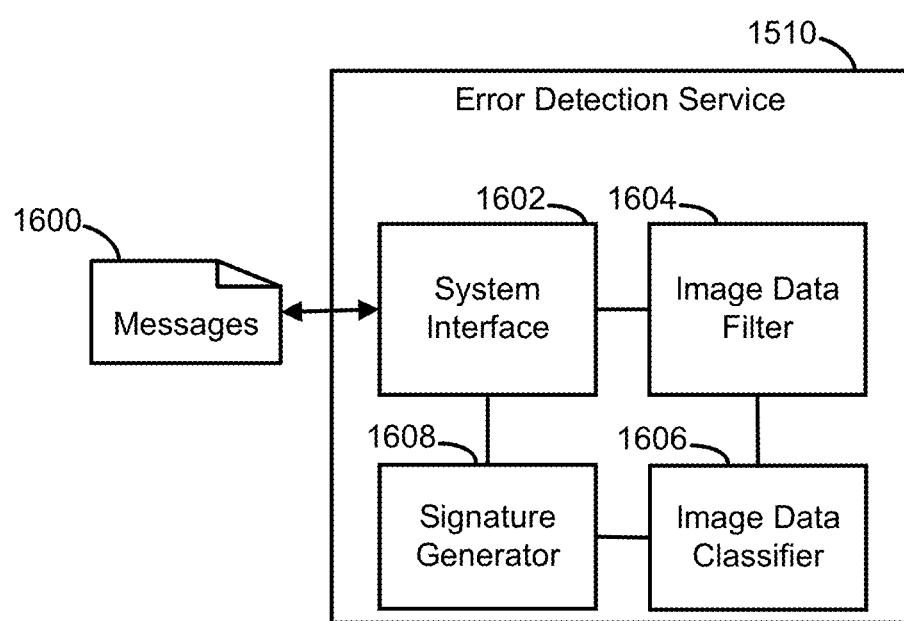
FIG. 16 is a block diagram of an error detection service in accordance with an example of the present disclosure.

As shown in FIG. 16, the detection service 1510 of FIG. 1 includes a system interface 1602, an image data filter 1604, an image data classifier 1606, and a signature generator 1608. In some examples, the system interface 1602 implements and exposes an application program interface (API) configured to transmit and/or receive messages that conform with the APIs or interfaces of other components. These components can include, for example, an ER service (e.g., the ER service 104 of FIG. 1), a session data store (e.g., the data store 1508 of FIG. 15), and a session recording server (e.g., the session recording server 1504). The messages 1600 can include session data, error records, signatures, and other data.

For instance, in some examples, the system interface 1602 is configured to interoperate with the data store 1508 (e.g., via SQL) and/or with the recording server 1504 (e.g., via an API) to request and receive session data. This session data can include, for example, image data depicting UIs of an application executing within a session associated with the session data. Further, in some examples, the system interface 1602 is configured to interoperate with the ER service by transmitting messages to the ER service that include signatures received from the signature generator 1608.

In some examples, the filter 1604 is configured to receive the session data from the system interface 1602 and determine whether the session data includes changes to image data presented within the session associated with the session data. In some examples, to reduce bandwidth required to exchange image data, the session data is encoded to include only changes to previously transmitted image data. As such, in these examples, the filter 1604 is simply configured to parse the session data, extract the changed image data, and provide the changed image data, which may include error messages, to the classifier 1606. In other examples, the session data is encoded to include static portions of image data in addition to changed portions. In these examples, the filter 1604 is configured to maintain baseline image data for the entire screen presented in the session and to identify changes by comparing new image data extracted from the session data to the baseline image data. The filter 1604 is further configured to provide any changed image data to the classifier 1606 prior to updating the baseline image data with the new image data.

In some examples, the classifier 1606 is configured to classify image data as including or not including an error message. In these examples, the classifier 1606 is configured to receive the image data and to execute one or more classification processes. For example, the classifier 1606 can be configured to execute an OCR process (e.g., transmit a request to an OCR cloud API) to extract text from the image data and to execute a keyword search on the extracted text. The keyword search process can be configured to identify whether the text data includes any keywords from the user-configurable dictionary described above with reference to the detection service 1510 of FIG. 15. In some examples, the keyword search process is configured to search for literal keywords and text that matches one or more regular expressions stored in metadata associated with the signatures.

Additionally or alternatively, the classifier 1606 can be configured to execute a computer vision/machine learning process trained to identify features within the image data that are commonly displayed in error messages. For example, the classifier 1606 can execute a convolutional neural network trained to detect error messages within image data. In this example, the convolutional neural network can be trained to detect error text and/or other visual objects, such as stop sign icons, warning sign icons, and the like within the image data. It should be noted that the classification techniques described above can be combined in various examples of the classifier 1606 in accordance with the principles described herein. The classifier 1606 is further configured to provide changed objects or elements that represent an error message to the signature generator 1608 for further processing. The classifier 1606 is also configured to take no further action where the changed objects or elements do not represent an error message.

In some examples, the signature generator 1608 is configured to generate a signature that can be used to identify future instances of an error message. This signature can be similar to, or the same as, a signature that would be generated by a UI monitor (e.g., the monitor 102 of FIG. 1) and can be generated from processed image data and/or other portions of session data. In some examples, the signature includes a representation of a hierarchy of UI elements. This UI hierarchy can include a representation of a root UI element and can continue through a line of descendants from the root UI element to the error message. For instance, in one example, the hierarchy includes a set of identifiers comprising an identifier of an application, an identifier of a window or page of the application in which the error message was displayed, an identifier of the main process that generated the error message, and/or an identifier of the error message.

In some examples, the identifier of the monitored application can be a name of the monitored application. The identifier of a window or page can be the window title or the page title. The identifier of the main process can be a name of the process and a module path for the monitored application or a URL at which the monitored application can be accessed. By including application and UI hierarchy information within the signature, the signature generator 1608 ensures uniqueness of the signature, even across multiple monitored applications.

In some examples, the signature generator 1608 is configured to further identify the error message by including additional information regarding the context of the object or element as rendered in the UI displayed in the session. In these examples, the signature generator 1608 is configured to determine coordinates of the error message within the UI through OCR or computer vision processes. The signature generator 1608 is further configured to identify rendered UI elements positioned to the left, top, right, and bottom of the error message. The signature generator 1608 can be further configured to identify a title of the error message and to store any part of all of this information in the identifier of the error message. Adding this additional information to the identifier of the error message can be particularly useful when processing error messages displayed within new windows (e.g., dialog messages).

In some examples, the signature generator 1608 is configured to include metadata descriptive of the error (e.g., error code, stack trace, process name, business organization, region, etc.) in signatures. This metadata can include user-configurable regular expressions to broaden the text classified by the classifier 1606 as an error message.

Figure 17:
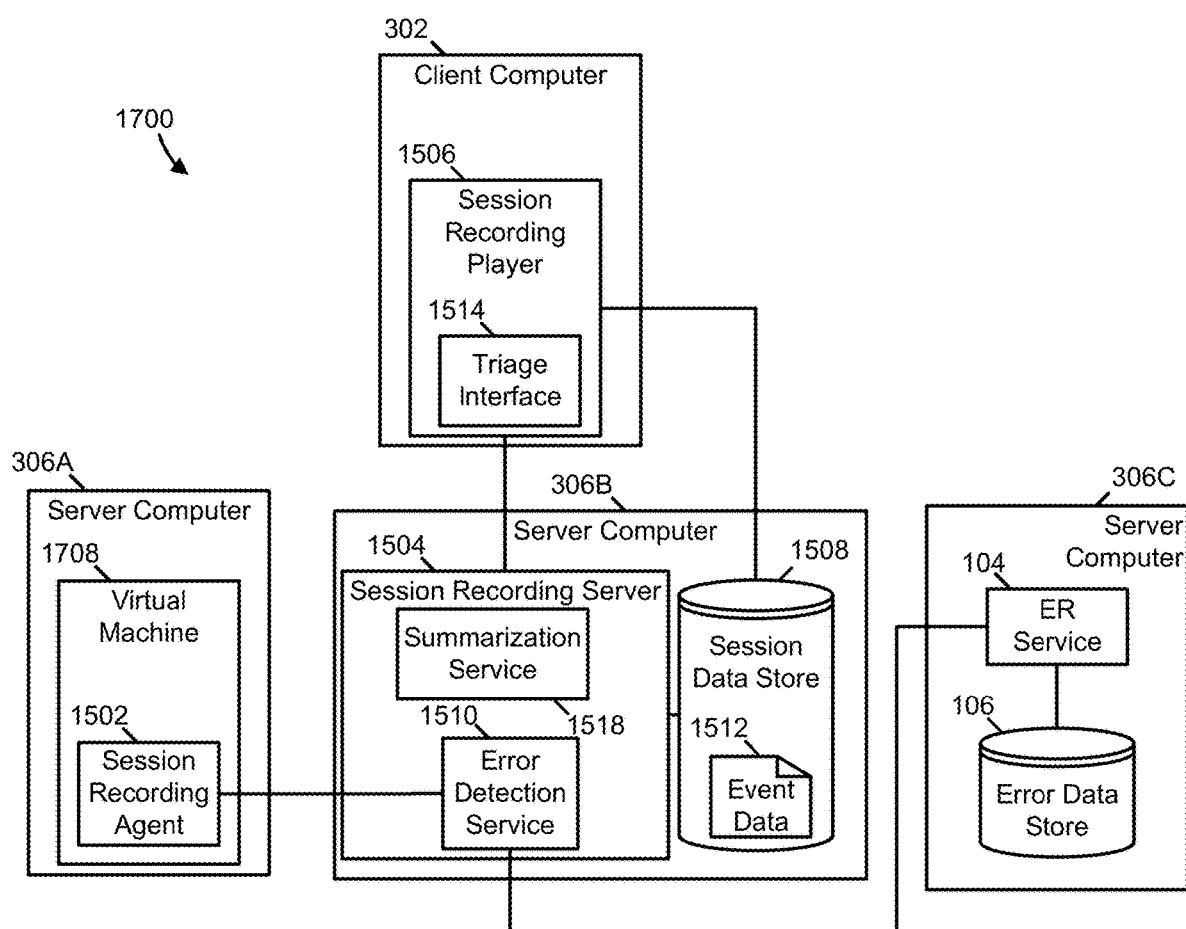
FIG. 17 is a block diagram of the session triage system of FIG. 15 as implemented by a specific configuration of computing devices in accordance with an example of the present disclosure.

FIG. 17 illustrates a session triage system (e.g., the system 1500 of FIG. 15) configured for operation within a distributed computing platform (e.g. the network environment 301 of FIG. 3). As shown in FIG. 17, the configuration 1700 includes the client computer 302 and the server computers 306A-306C of FIG. 3. Within the configuration 1700, the computer systems 302 and 306A-306C are communicatively coupled to one another and exchange data via a network (e.g., the networks 304 and/or 304' of FIG. 3).

As shown in FIG. 17, the server 306A is configured to host a virtual machine 1708. The virtual machine 1708, in turn, is configured to host the agent 1502 of FIG. 15. The server 306B is configured to host the recording server 1504 and the data store 1508 of FIG. 15. The recording server 1504 is configured to host the detection service 1510 and the summarization service of FIG. 15. The data store 1508 is organized to store event data 1512 of FIG. 15. The server 306C is configured to host the ER service 104 and error data store 106 of FIG. 1. The client computer 302 is configured to host the player 1506 of FIG. 15, which implements the triage interface 1514 of FIG. 15. Many of the components illustrated in FIG. 17 are described above with reference to FIGS. 1, 3, and 15. For purposes of brevity, those descriptions will not be repeated here, but each of the components of FIGS. 1, 3, and 15 included in FIG. 17 is configured to function in FIG. 17 as described in FIGS. 1, 3, and 15. However, the descriptions of any of these components may be augmented or clarified below.

As illustrated in FIG. 17, the configuration 1700 is configured to record any interactive computing sessions executed within the virtual machine 1708, detect error messages presented therein, and present those error messages to support personnel for triage. As part of this service, the agent 1502 is configured to record I/O operations, processing operations, and security operations executed by the virtual machine 1708 at the request of one or more client processes (not shown). For instance, the agent 1502 can be configured to generate session data (e.g., ICA data) descriptive of the recorded operations. As shown in FIG. 17, the agent 1502 is configured to transmit this session data to the detection service 1510 via the recording server 1504.

The detection service 1510 is configured to identify changes to image data rendered within the session, determine whether identified changes include any error messages, generate signatures identifying any included error messages, and transmit requests to the ER service 104 to identify any remediations associated with the signatures. The ER service 104 is configured to respond to the request by transmitting messages including remediations or acknowledgements. The detection service 1510 is further configured to store, in the event data 1512, data descriptive of error messages without associated remediations, so that those error messages can be triaged.

The recording player 1506 is configured to provide a session triage interface 1514 to support personnel to enable troubleshooting error messages and other events stored in the event data 1512. More specifically, the session triage interface 1514 is configured to interact with support personnel to display filtered event information and receive input specifying remediations. In some examples, the session triage interface 1514 is further configured to interoperate with the player 1506 to playback session recordings and/or session summaries. These and other aspects of the session triage interface are described further below with reference to FIGS. 19-21.

The configuration 1700 is but one example of many potential configurations that can be used to implement the system 1500. For instance, in some examples, the detection service 1510 is configured to provide signatures to the recording server 1504 rather than the ER service 104. In these examples, the recording server 1504 is configured to interoperate with the ER service 104 to drive error message detection and triage. In other examples, the detection service 1510 can be configured to communicate signatures to other processes hosted by the server 306B. Further, in some examples, the data store 1508 is hosted by a server computer that is distinct from the server computer 306B. As such, the examples disclosed herein are not limited to the particular configuration 1700 and other configurations are considered to fall within the scope of this disclosure.

Figure 24:
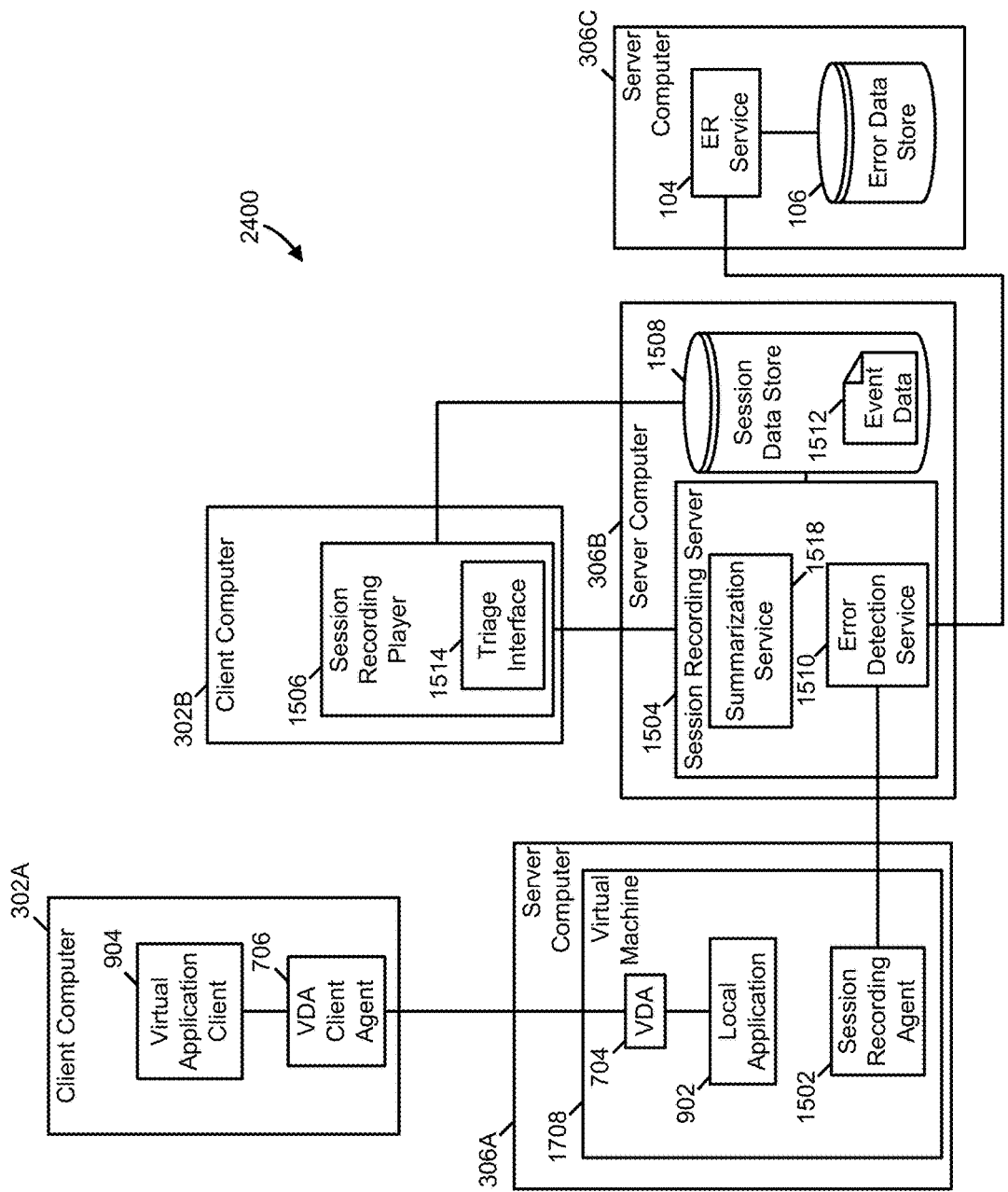
FIG. 24 is a block diagram of the session triage system of FIG. 15 as implemented by a specific configuration of computing devices in accordance with an example of the present disclosure.

FIG. 24 illustrates a session triage system (e.g., the system 1500 of FIG. 15) configured for operation within a distributed computing platform (e.g. the network environment 301 of FIG. 3). As shown in FIG. 24, the configuration 2400 includes the client computers 302A and 302B and the server computers 306A-306C of FIG. 3. Within the configuration 2400, the computer systems 302A, 302B, and 306A-306C are communicatively coupled to one another and exchange data via a network (e.g., the networks 304 and/or 304' of FIG. 3).

As shown in FIG. 24, the server 306A is configured to host the virtual machine 1708 of FIG. 17. The virtual machine 1708, in turn, is configured to host the agent 1502 of FIG. 15, the local application 902 of FIG. 9, and the VDA 704 of FIG. 7. The server 306B is configured to host the recording server 1504 and the data store 1508 of FIG. 15. The recording server 1504 is configured to host the detection service 1510 and summarization service 1518 of FIG. 15. The data store 1508 is organized to store event data 1512 of FIG. 15. The server 306C is configured to host the ER service 104 and error data store 106 of FIG. 1. The client computer 302B is configured to host the player 1506 of FIG. 15, which implements the triage interface 1514 of FIG. 15. The client 302A is configured to host the virtual application client 904 and the VDA client agent 706. The VDA 704 and the VDA client agent 706 are configured to establish a virtualization infrastructure between the client 302A and the server 306A. Many of the components illustrated in FIG. 24 are described above with reference to FIGS. 1, 3, 7, 9, 15, and 17. For purposes of brevity, those descriptions will not be repeated here, but each of the components of FIGS. 1, 3, 7, 9, 15, and 17 included in FIG. 24 is configured to function in FIG. 24 as described in FIGS. 1, 3, 7, 9, 15, and 17. However, the descriptions of any of these components may be augmented or clarified below.

As illustrated in FIG. 24, the configuration 2400 is configured to record any interactive computing sessions executed within the virtual machine 1708, detect error messages presented therein, and present those error messages to support personnel for triage. As part of this service, the agent 1502 is configured to record I/O operations, processing operations, and security operations executed by the virtual machine 1708 at the request of one or more client processes, such as the local application 902 as controlled by the virtual application client 904 and the virtualization infrastructure provided by the VDA client agent 706 and the VDA 704. For instance, the agent 1502 can be configured to generate session data (e.g., ICA data) descriptive of the recorded operations. As shown in FIG. 24, the agent 1502 is configured to transmit this session data to the detection service 1510 via the recording server 1504.

The detection service 1510 is configured to identify changes to image data rendered within the session (e.g., by the local application 902), determine whether identified changes include any error messages, generate signatures identifying any included error messages, and transmit requests to the ER service 104 to identify any remediations associated with the signatures. The ER service 104 is configured to respond to the request by transmitting messages including remediations or acknowledgements. The detection service 1510 is further configured to store, in the event data 1512, data descriptive of error messages without associated remediations, so that those error messages can be triaged.

The recording player 1506 is configured to provide a session triage interface 1514 to support personnel to enable troubleshooting error messages and other events stored in the event data 1512. More specifically, the session triage interface 1514 is configured to interact with support personnel to display filtered event information and receive input specifying remediations. In some examples, the session triage interface 1514 is further configured to interoperate with the player 1506 to playback session recordings and/or session summaries. These and other aspects of the session triage interface are described further below with reference to FIGS. 19-21.

The configuration 2400 is but one example of many potential configurations that can be used to implement the system 1500. For instance, in some examples, the detection service 1510 is configured to provide signatures to the recording server 1504 rather than the ER service 104. In these examples, the recording server 1504 is configured to interoperate with the ER service 104 to drive error message detection and triage. In other examples, the detection service 1510 can be configured to communicate signatures to other processes hosted by the server 306B. Further, in some examples, the data store 1508 is hosted by a server computer that is distinct from the server computer 306B. Further, it should be noted that the applications recorded by the agent 1502 can be any application that produces triage errors. As such, the examples disclosed herein are not limited to the particular configuration 2400 and other configurations are considered to fall within the scope of this disclosure.

Session Triage Processes

Figure 18:
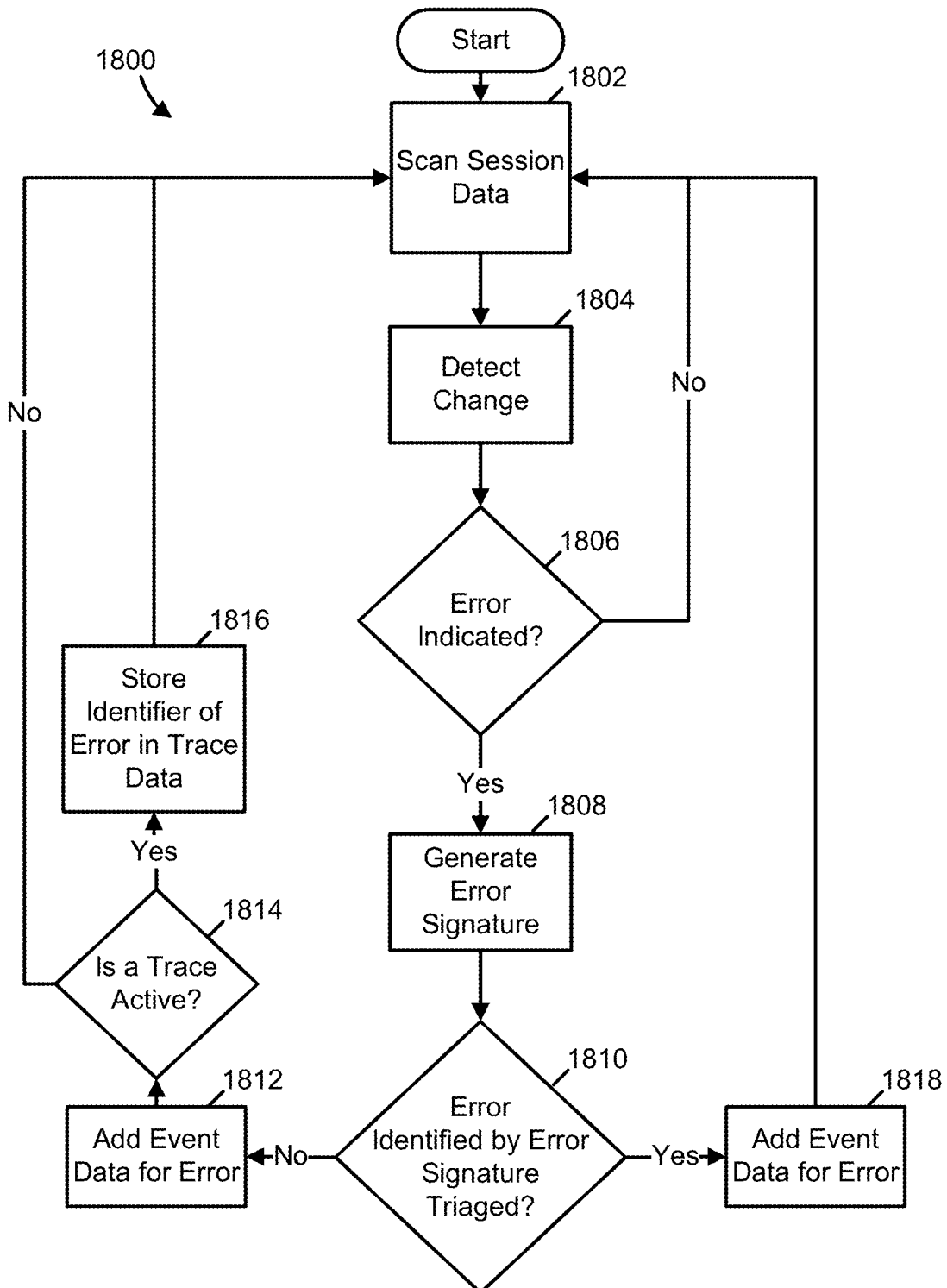
FIG. 18 is a flow diagram of a session triage process in accordance with an example of the present disclosure.

Some examples of the system 1500 of FIG. 15 are configured to execute session triage processes. FIG. 18 illustrates a session triage process 1800 executed by the system 1500 in some examples.

The process 1800 starts with a detection service (e.g., the detection service 1510 of FIG. 15) scanning 1802 session data associated with an interactive computing session. For example, the detection service can register with a session recording server (e.g., the recording server 1504 of FIG. 15) to receive live session data generated by a session recording agent (e.g., the agent 1502 of FIG. 15). Alternatively or additionally, the detection service can poll a session data store (e.g., the session data store 1508 of FIG. 15) for session data and scan any session data added to the session data store since its last successful polling operation.

The detection service detects 1804 a change in image data present within the session data. For instance, the detection service can execute a filter (e.g., the image data filter 1604 of FIG. 16) that processes the image data to detect changes therein. In some examples, the session data expressly identifies the changes and the filter need only parse the session data to detect the changes. In other examples, the filter maintains a sequence of frames of image data and compares members of the sequence to detect the changes.

The detection service determines 1806 whether filtered changes indicate the presence of an error message in the UI of the session. For instance, the detection service can execute a classifier (e.g., the classifier 1606) that classifies the filtered changes as either representing or not representing an error message. The classifier can operate on image data or text extracted from image data, as described above. Where the detection service determines 1806 that the filtered changes do not represent an error message, the detection service returns to scanning 1802 the session data.

Where the detection service determines 1806 that the filtered changes do represent an error, the detection service generates 1808 an error signature. For instance, the detection service can execute a signature generator (e.g., the signature generator 1608 of FIG. 16). The signature can include portions of a hierarchy of UI elements present in the UI. For instance, the signature can include an identifier of a root UI element and a line of descendants of the root terminating in the error message or an identifier thereof.

The detection service determines 1810 whether the error message has been triaged by support personnel. For instance, the detection service can transmit a request to the ER service that includes the signature. In response, the ER service can search a collection of error records (e.g., the error data store 106) to determine whether a record storing the signature and a remediation exists in the collection. Where the ER service identifies a record storing the signature and the remediation within the collection, the ER service transmits a response to the detection service that identifies the remediation. Where the ER service identifies no record storing the signature and the remediation within the collection, the ER services transmits a response to the detection service that includes an acknowledgement. Where the response includes a remediation, the detection service determines 1810 that the error message identified by the signature has been triaged, adds 1818 event data (e.g., the event data 1512 of FIG. 15) to the session data store, and returns to scanning 1802 session data. The event data added 1818 can include an event triage status of complete. Recording of the occurrence of even triaged events can be useful telemetry data that can be analyzed to provide insight as to the number of end users who encountered the error. Where the response includes an acknowledgment, the detection service determines 1810 that the error message identified by the signature has not been triaged.

Where the detection service determines 1810 that the error identified by the signature is not triaged, the detection service adds 1812 event data (e.g., the event data 1512 of FIG. 15) to the session data store. This event data can include a signature generated for the error message, the text included in the error message, the triage status of the error message, a timestamp indicating when the error message was displayed within its corresponding session, and image data including the error message. The added 1812 event data can further include an update to the overall triage status of the session recording (e.g., incrementing counter of the number of instances of the error within the session recording, updating the number of events triaged or pending triage, etc.).

The detection service determines 1814 whether a trace is actively executing for the session. For instance, the detection service can transmit a message to a diagnostic service (e.g., the diagnostic service 1516 of FIG. 15) to request information regarding its operating status. The detection service can receive a response from the diagnostic service and determine from the content of the response whether a trace is actively executing for the session. Where the detection service determines 1814 that a trace is actively executing, the detection service transmits a message (e.g., an inter-process communication mechanism) to the session recording agent to store 1816 diagnostic data within the trace. Where the detection service determines 1814 that a trace is not actively executing, the detection service returns to scanning 1802 session data.

Processes in accordance with the process 1800 enable the system 100 to detect error messages encountered by end users with sessions and present those error for triage, as described herein.

Session Triage Interface

Figure 19:
FIG. 19 is a front view of a screen provided by a session triage interface in accordance with an example of the present disclosure.

As described above, in various examples disclosed herein, a session triage interface (e.g., the session triage interface 1514 of FIG. 1) provides a user interface to enable support personnel to triage errors encountered by end users within interactive computing sessions. FIG. 19 illustrates one example of a triage interface screen 1900 provided by one example of the session triage interface. Remediations defined by the support personnel via this session triage interface are stored within error records documenting the error message and its remediation, thereby enabling an error remediation system (e.g., the error remediation system 100 of FIG. 1) to provide the remediation to end users who encounter the error message in the future.

As shown in FIG. 19, the screen 1900 is organized into columns and rows. In some examples, the session triage interface is configured to provide, in the screen 1900, a row for each an error record stored in an error data store (e.g., the error data store 106 of FIG. 1), subject to one or more filters. Types of information stored in or associated with an error record that can be used by the session triage interface to filter the rows provided in the screen 1900 include business organization, region, site, user, number of users affected, and error message to name a few.

As shown in FIG. 19, the screen 1900 includes an app/URL column 1902, an error column 1904, an organization impact column 1906, a user impact column 1908, an instances column 1910, a playback column 1912, a remediation message column 1914, a remediation link column 1916, and an update column 1918. The app/URL column 1902 includes a set of controls that each display an identifier (e.g., a name) of an app/URL that generated one or more error messages. The error column 1904 includes a set of controls that each display an error message encountered by an end user. The organization impact column 1906 includes a set of controls that each display a number of organizations with end users who have encountered the error message. The user impact column 1908 includes a set of controls that each display a number of end users who have encountered the error message. The instances column 1910 includes a set of controls that each display a number of times the error message has been displayed to an end user. The playback column 1912 includes a set of playback controls. In some examples, the session triage interface is configured to initiate playback of a session recording, via a player (e.g., the session recording player 1506 of FIG. 15), in response to receiving a selection of one of the set of playback controls. This session recording can include one or more instances of the error associated with the row of the selected playback control. In at least one of these examples, the session triage interface is configured to, in response to receiving the selection, navigate directly to a point in the session recording associated with the error and at which the error message is displayed.

In certain examples, each playback control of the set of playback controls identifies a session recording that includes the error associated with its row. In at least one of these examples, the session triage interface is configured to identify a "top recording" for each error and store an identifier of the top recording within a property of its associated link control. For example, the session triage interface can identify a top recording as having more instances of the error than other recordings. In another example, the session triage interface can identify a top recording as having more instances per rendered second than other recordings. Other ranking processes can be used to identify a top recording in various examples. For instance, in some examples, the data used to identify the top ranking can be filter to specific time ranges, customers, regions, and/or other dimensions.

In some examples, the remediation message column 1914 includes a set of controls that each are configured to accept text articulating a remediation message to display in conjunction with the error message. The remediation link column 1916 includes a set of controls that each are configured to accept text articulating a hyperlink to display in conjunction with the error message. The hyperlink can, for example, link to an article describing a workaround for the error or a fix for the error. The update column 1918 includes a set of update controls. The session triage interface is configured to update the error record associated with a row in response to receiving a selection of an update control included within the row.

Figure 20:
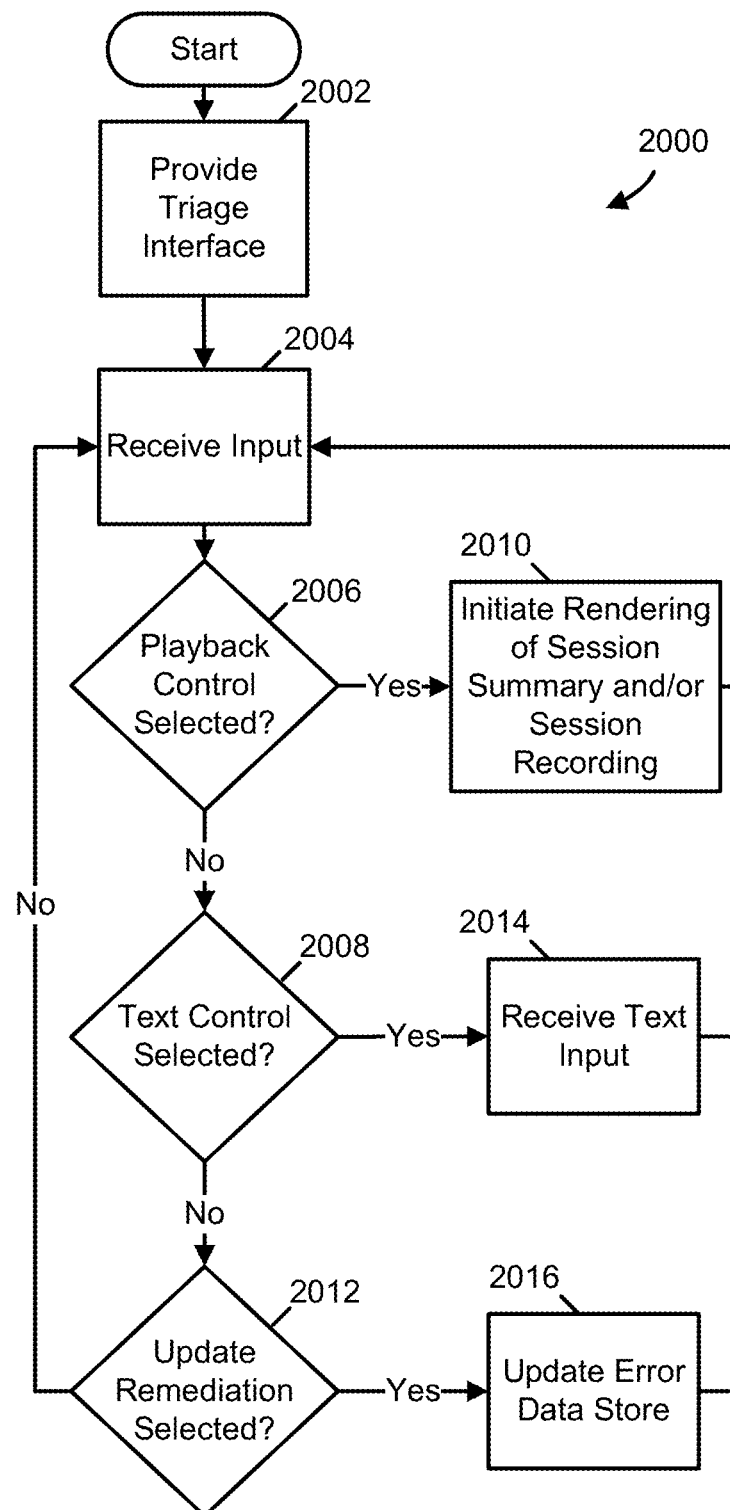
FIG. 20 is a flow diagram of a session triage process in accordance with an example of the present disclosure.
Figure 21:
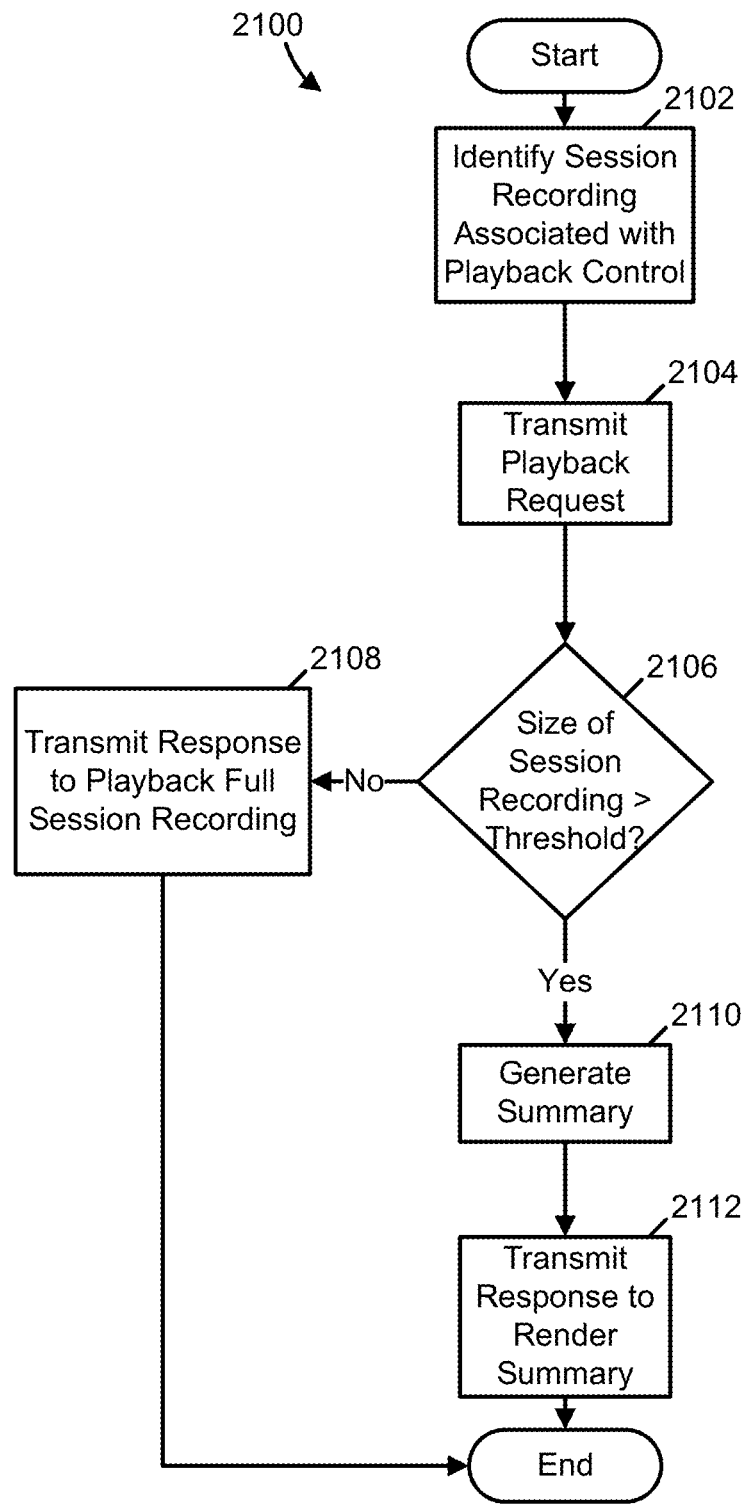
FIG. 21 is a flow diagram of a recording playback process in accordance with an example of the present disclosure.

In some examples, a session triage interface is configured to execute a session triage process using the screen 1900. One example of a session triage process 2000 in accordance with these examples is illustrated in FIG. 20. As shown in FIG. 20, the process 2000 starts with the session triage interface providing 2002 a triage interface screen (e.g., the screen 1900 of FIG. 19). The session triage interface receives 2004 input (e.g., a selection of a control of the interface screen). The session triage interface determines 2006 whether a playback control was selected.

Where the session triage interface determines 2006 that a playback control was selected, the session triage interface initiates 2010 a process to playback a session recording associated with the selected playback control and/or a summary of the session recording. FIG. 21 illustrates one example of such a provisioning process 2100 in accordance with some examples. Upon completion of the playback, the session triage interface returns to receiving 2004 input.

As shown in FIG. 21, the session triage interface identifies 2102 the session recording associated with the playback control. For instance, in some examples, the session triage interface accesses a property of the playback control that identifies the session recording associated with the playback control.

The session triage interfaces transmits 2104 a playback request. For instance, in some examples, the session triage interface transmits the playback request to a player (e.g., the session recording player 1506 of FIG. 15). The request can include an identifier of the session recording and an indicator that either the full session recording or a summary of the session recording is acceptable. In response to receiving the playback request, the player forwards the playback request to a session recording server (e.g., the session recording server 1504 of FIG. 15). The session recording server parses the request and determines that either the full session recording or a summary is acceptable.

Figure 22:
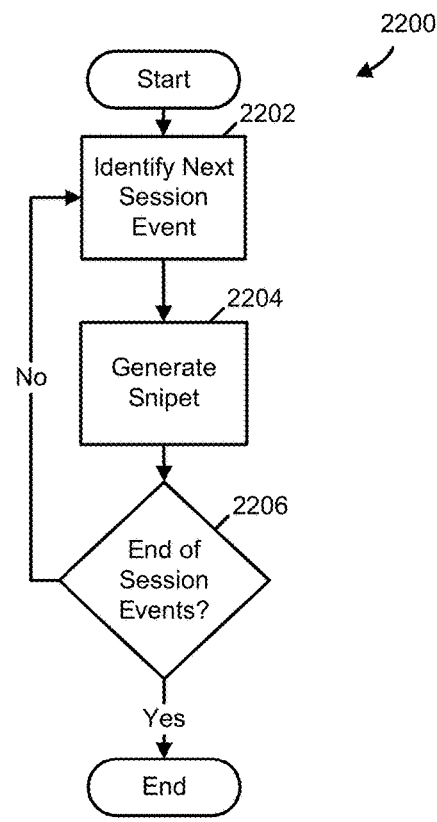
FIG. 22 is a flow diagram of an summarization process in accordance with an example of the present disclosure.

The session recording server provides the request to a summarization service (e.g., the summarization service 1518 of FIG. 15). The summarization service determines 2106 whether the size of the full session recording transgresses a user or system configurable threshold value. This threshold value can be included in the playback request, although this is not a requirement. Where the summarization service determines 2106 that the size of the full session recording does not transgress the threshold value, the summarization service instructs the session recording server to transmit 2108 a response to the player to initiate playback of the full session recording. The session recording server transmits the response to the player. The player receives and parses the response, accesses the full session recording as stored in a session data store (e.g., the session data store 1508 of FIG. 15), and plays the full session recording. In some examples, the player automatically navigates to a point in the full session recording associated with the error. Alternatively or additionally, the player can annotate the full session recording with event data (e.g., the event data 1512 of FIG. 15) at corresponding temporal locations within the full recording session.

Where the session recording server determines 2106 that the size of the full session recording transgresses the threshold value, the session recording server generates 2110 a summary by, for example, executing a summarization service (e.g., the summarization service 1518 of FIG. 15). The summarization service receives an identifier of the session recording from the session recording server and executes a process to summarize the identified session recording. FIG. 22 illustrates one example of such a summarization process 2200.

As shown in FIG. 22, the summarization process starts with the summarization service identifying 2202 the next event within the identified session recording. In some examples, the summarization service identifies the next event by accessing the event data associated with the identified session recording. In these examples, the event data associated with the identified session recording specifies events that occurred therein. As described above, the event data can include data descriptive of errors and other events of interest to support personnel. This data can include temporal location (e.g., a timestamp) of the events.

The summarization service generates 2204 a snippet including a subset of session data from the full session recording that depicts the identified session event. For example, the snippet can be a precise point in the session data (e.g., image data depicting an error message or a screenshot that includes the error message). In other examples, the snippet is a subset of the session data that, when rendered, spans a user or system configurable interval within the full session recording. The basis of the interval can vary between examples. For instance, in some examples, the interval is temporal (e.g., spans a period of time between 1 and 5 seconds before and/or after occurrence of the event). Additionally or alternatively, the interval can based on user interaction with the client device (e.g., spans a period between 1 and 3 interactions before and/or after occurrence of the event). After the snippet is generated 2204, the summarization service adds it to the summary of the full session recording.

The summarization service determines 2206 whether the identified event is the last event associated with the session recording. Where the summarization service determines that the identified event is not the last event, the summarization service returns to identify 2202 the next session event. Where the summarization service determines that the identified event is the last event, the summarization service closes the summary and terminates the process 2200.

Figure 23:
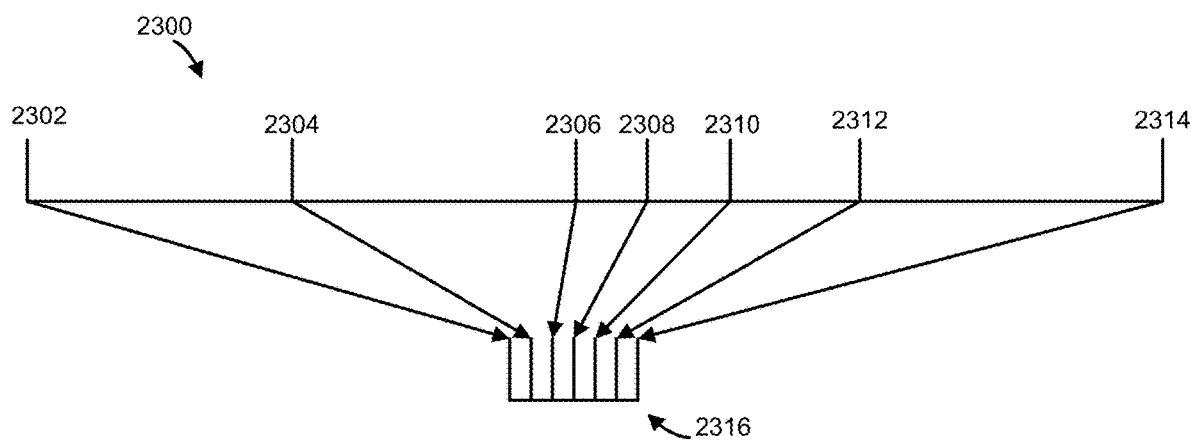
FIG. 23 is a schematic diagram of a full session recording and a summary thereof in accordance with an example of the present disclosure.

Processes in accordance with the process 2200 enable a session recording server to create succinct summaries of full session recordings that can be easily transmitted to remote players for subsequent processing. FIG. 23 illustrates an example of both a full session recording 2300 and a summary 2316 as processed by the process 2200. The full session recording 2300 includes several events 2302-2314. These events may include session recording starts and ends (e.g., events 2302 and 2314), updates of registry values of the client device (e.g., event 2304), and error messages (e.g., events 2306-2312). As shown in FIG. 23, after the full session recording 2300 is processed according to the process 2200, the summary 2316 includes snippets of each of the event 2302-2314 but consists of much less session data.

Returning to the process 2100, the summarization service instructs the session recording server to transmit 2112 a response to the player to initiate playback of the summary. The session recording server transmits the response to the player. The player receives and parses the response, accesses the summary as stored in the session data store, and plays the summary. In some examples, the player annotates the summary with event data at corresponding temporal locations within the summary.

Processes in accordance with the process 2100 enable a session triage system to provide support personnel with full session recordings and/or streamlined session summaries that facilitate triage of error messages, even where network bandwidth within the system is low.

Returning to the process 2000, where the session triage interface determines 2006 that a playback control was not selected via the received input, the session triage interface determines 2008 whether a text control (e.g., a control from either column 1914 or column 1916) was selected.

Where the session triage interface determines 2008 that a text control was selected, the session triage interface receives 2014 text input and stores that input in the selected control. Where the session triage interface determines 2008 that a text control was not selected, the session triage interface determines 2012 whether an update control (e.g. a control from column 1912) was selected.

Where the session triage interface determines 2012 that an update control was not selected, the session triage interface returns to receiving 2004 input. Where the session triage interface determines 2012 that an update control was selected, the session triage interface updates 2016 an error record associated with the row including the selected update control. In executing the update, the session triage interface replaces the values in the error record with the contents of the text controls in the selected row. Further, in some examples, in executing the update, the session triage interface updates the triage status to complete for each event within the session data store having the same signature as the signature in the error record. In these examples, the session triage interface further updates the triage status to complete for each session associated with no untriaged events.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising a memory and at least one processor coupled to the memory, the at least one processor configured to:
 scan session data representative of operation of a user interface comprising a set of user interface elements, wherein each user interface element in the set has a visual appearance in the user interface;
evaluate, at a point in the session data, a difference in the visual appearance of at least one changed element within the set of user interface elements, wherein the difference includes a visual representation of an identified keyword that is added to the visual appearance of the at least one changed element;
classify the at least one changed element as indicating an error;
store an association between the error and the point in the session data; and
provide access to the point in the session data via the association.

2. The computer system of claim 1, wherein:
evaluating the difference in the visual appearance of the at least one changed element further comprises identifying the keyword that is added to the visual appearance; and
the at least one changed element is classified as indicating the error in response to locating the identified keyword in a dictionary that correlates a plurality of keywords with a plurality of error messages.

3. The computer system of claim 1, wherein the at least one processor is further configured to detect the at least one changed element within the set of user interface elements.

4. The computer system of claim 1, wherein:
evaluating the difference in the visual appearance of the at least one changed element further comprises identifying the keyword that is added to the visual appearance; and
classifying the at least one changed element further comprises searching for the identified keyword in a dictionary that correlates a plurality of keywords with a plurality of error messages.

5. A computer system comprising a memory and at least one processor coupled to the memory, the at least one processor configured to:
scan session data representative of operation of a user interface comprising a plurality of user interface elements;
detect, at a point in the session data, at least one changed element within the plurality of user interface elements;
identify a keyword that is added to a visual appearance of the at least one changed element;
classify, in response to detecting the at least one changed element, the at least one changed element as either indicating or not indicating an error;
store event data that is descriptive of the at least one changed element and the point in the session data at which the at least one changed element was detected; and
provide access to the point in the session data via the event data.

6. The computer system of claim 5, wherein:
the at least one changed element is classified in response to locating the identified keyword in a dictionary that correlates a plurality of keywords with a plurality of error messages.

7. The computer system of claim 5, wherein the at least one processor is further configured to evaluate a difference in the visual appearance of the at least one changed element.

8. A method of enhancing data descriptive of computer operations, the method comprising:
scanning session data representative of operation of a user interface comprising a set of user interface elements, wherein each user interface element in the set has a visual appearance in the user interface;
evaluating, at a point in the session data, a difference in the visual appearance of at least one changed element within the set of user interface elements, wherein evaluating the difference comprises identifying a keyword that is added to the visual appearance;
classifying the at least one changed element as indicating an error, wherein classifying the at least one changed element comprises searching for the identified keyword in a dictionary that correlates a plurality of keywords with a plurality of error messages;
storing an association between the error and the point in the session data; and
providing access to the point in the session data via the association.

9. The method of claim 8, wherein the difference includes a visual representation of the identified keyword that is added to the visual appearance of the at least one changed element.

10. The method of claim 8, wherein:
the at least one changed element is classified as indicating the error in response to locating the identified keyword in the dictionary.

11. The method of claim 8, wherein the at least one processor is further configured to detect the at least one changed element within the set of user interface elements.

12. A computer system comprising a memory and at least one processor coupled to the memory, the at least one processor configured to:
scan session data representative of operation of a user interface comprising a set of user interface elements, wherein each user interface element in the set has a visual appearance in the user interface;
evaluate, at a point in the session data, a difference in the visual appearance of at least one changed element within the set of user interface elements, wherein the difference includes a visual representation of an identified keyword that is added to the visual appearance of the at least one changed element;
determine whether the identified keyword indicates an error by searching for the identified keyword in a dictionary that correlates a plurality of keywords with a plurality of error messages; and
classify the at least one changed element as indicating the error.

13. The computer system of claim 12, wherein the at least one processor is further configured to store an association between the error and the point in the session data.

14. The computer system of claim 12, wherein the at least one changed element is classified as indicating the error in response to locating the identified keyword in the dictionary.

15. The computer system of claim 12, wherein the at least one processor is further configured to detect the at least one changed element within the set of user interface elements.

16. The computer system of claim 12, wherein the at least one processor is further configured to store event data that is descriptive of the at least one changed element and the point in the session data at which the at least one changed element was evaluated.

* * * * *